US012597162B2

(12) United States Patent
Schulz et al.

(10) Patent No.: US 12,597,162 B2
(45) Date of Patent: Apr. 7, 2026

(54) SYSTEM CALIBRATION USING REMOTE SENSOR DATA

(71) Applicant: Cavnue Technology, LLC, Arlington, VA (US)

(72) Inventors: Katerina Patrice Schulz, San Francisco, CA (US); Vishal Mandal, Ypsilanti, MI (US); Abhishek Baral, Farmington Hills, MI (US); Cyrus Blankinship, Brooklyn, NY (US); David Hahn Clifford, Royal Oak, MI (US)

(73) Assignee: Cavnue Technology, LLC, Arlington, VA (US)

( * ) Notice: Subject to any disclaimer, the term of this patent is extended or adjusted under 35 U.S.C. 154(b) by 279 days.

(21) Appl. No.: 17/721,915

(22) Filed: Apr. 15, 2022

(65) Prior Publication Data

US 2023/0334699 A1 Oct. 19, 2023

(51) Int. Cl.
*G06T 7/80* (2017.01)
*G01S 19/48* (2010.01)
*G06T 11/40* (2006.01)

(52) U.S. Cl.
CPC .............. *G06T 7/80* (2017.01); *G01S 19/485* (2020.05); *G06T 11/40* (2013.01); *G06T 2207/30184* (2013.01); *G06T 2207/30236* (2013.01)

(58) Field of Classification Search
CPC .... G06V 20/582; G06V 10/454; G06V 10/82; G06V 20/584; G06N 3/045; G06N 3/063; G06N 3/08; G06N 7/00; G06N 20/00
See application file for complete search history.

(56) References Cited

U.S. PATENT DOCUMENTS 8,390,686 B2    3/2013  Tanaka
9,721,168 B2    8/2017  Saptharishi et al.
(Continued)

FOREIGN PATENT DOCUMENTS

CN        112819895 A  *  5/2021
JP        2008006861 A  *  1/2008
JP        2020195089 A  *  12/2020

OTHER PUBLICATIONS

International Search Report and Written Opinion in International Appln. No. PCT/US2023/011594, mailed on May 2, 2023, 16 pages.
(Continued)

*Primary Examiner* — Huo Long Chen
(74) *Attorney, Agent, or Firm* — Fish & Richardson P.C.

(57) ABSTRACT

Methods, systems, and apparatus, including computer programs encoded on computer storage media, for monitoring characteristics of cameras used for road surveillance. In some implementations, a plurality of first image frames are obtained from a camera monitoring a specific geographical area. For each first image frame of the plurality of first image frames, a second image frame is generated by adjusting a viewpoint of the first image frame. A third image frame is generated by rasterizing the second image frame. Photonic content is identified in the third image frame. Invariant components are determined in a plurality of third image frames based on the photonic content identified in subsequent third image frames. Position changes of the camera are determined by identifying position changes of the invariant components in the subsequent third image frames. In response to determining the position changes of the camera, a position of the camera is adjusted.

20 Claims, 7 Drawing Sheets

(56)                    References Cited

U.S. PATENT DOCUMENTS

|  |  |  |  |  |
|---|---|---|---|---|
| 9,894,325 | B2 | 2/2018 | Rauscher et al. | |
| 10,055,649 | B2 | 8/2018 | Grauer et al. | |
| 10,713,499 | B2 | 7/2020 | Wu et al. | |
| 10,733,463 | B1 * | 8/2020 | Jain ........................ | G06V 20/41 |
| 2008/0240616 | A1 * | 10/2008 | Haering ................. | G06V 20/52 |
|  |  |  |  | 382/294 |
| 2011/0043689 | A1 * | 2/2011 | Cobb ..................... | H04N 5/147 |
|  |  |  |  | 348/E7.003 |
| 2014/0313347 | A1 | 10/2014 | Wu et al. | |
| 2015/0077549 | A1 | 3/2015 | Wu | |
| 2021/0406560 | A1 * | 12/2021 | Park .......................... | G06T 7/70 |

OTHER PUBLICATIONS

International Preliminary Report on Patentability in International Appln. No. PCT/US2023/011594, mailed on Oct. 24, 2024, 11 pages.

\* cited by examiner

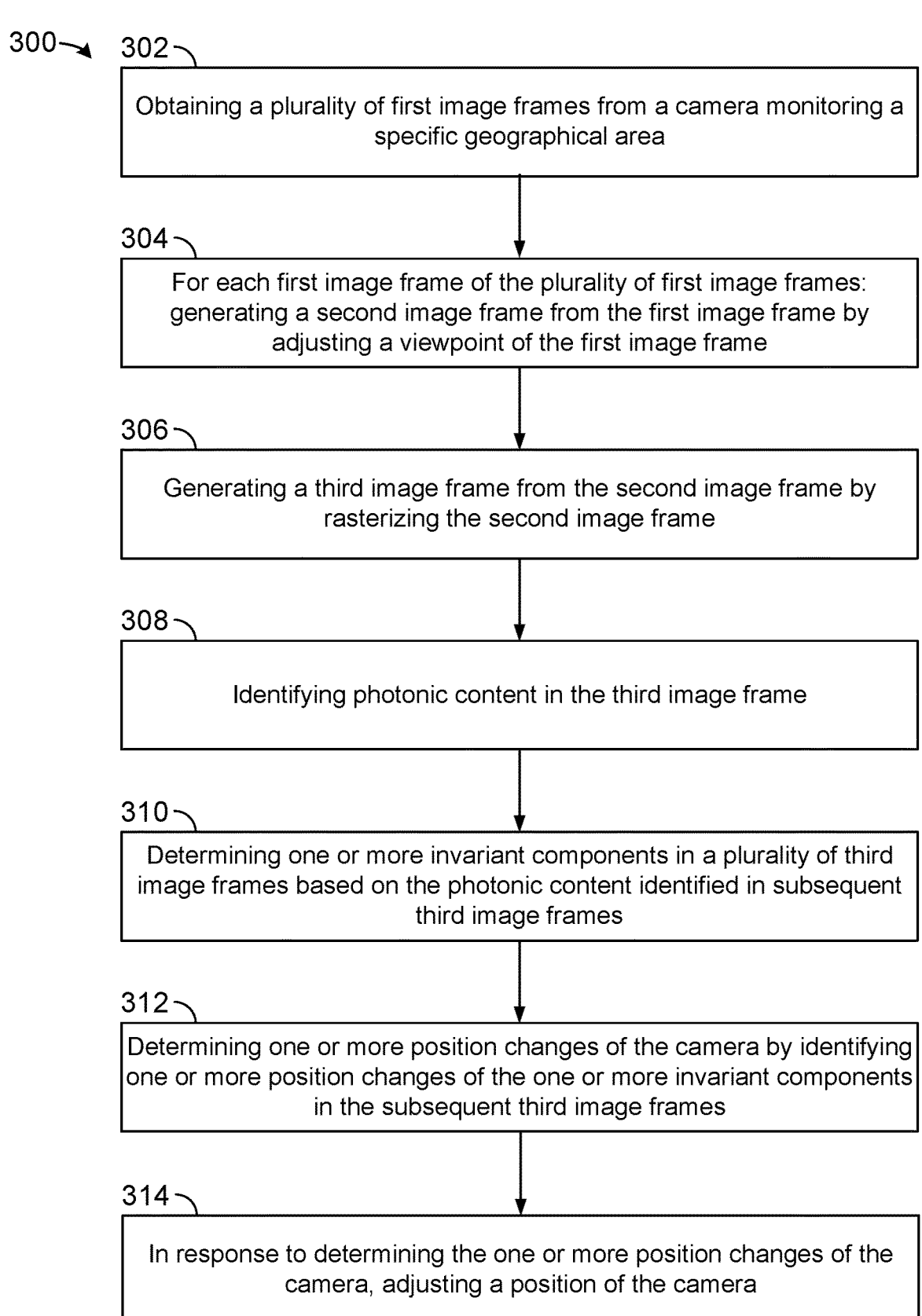

300

302
Obtaining a plurality of first image frames from a camera monitoring a specific geographical area 304
For each first image frame of the plurality of first image frames: generating a second image frame from the first image frame by adjusting a viewpoint of the first image frame 306
Generating a third image frame from the second image frame by rasterizing the second image frame 308
Identifying photonic content in the third image frame 310
Determining one or more invariant components in a plurality of third image frames based on the photonic content identified in subsequent third image frames 312
Determining one or more position changes of the camera by identifying one or more position changes of the one or more invariant components in the subsequent third image frames 314
In response to determining the one or more position changes of the camera, adjusting a position of the camera

FIG. 3

SYSTEM CALIBRATION USING REMOTE SENSOR DATA

TECHNICAL FIELD

This specification generally relates to road surveillance, and one particular implementations relates to monitoring characteristics of one or more cameras that are used for road surveillance.

BACKGROUND

Vehicles can travel on roadways, highways, and back-roads to their destination. In many cases, a vehicle can travel along a road with other vehicles and is positioned behind the other vehicles, next to another vehicle, or in front of another vehicle during its journey. Additionally, vehicles often move positions on the roadway by accelerating, decelerating, or changing lanes. Given the number of vehicles in any given section of road, and the changing speed and positions of the vehicles, collecting and maintaining vehicle speed and position data, and other vehicle data, is a complex and processing intensive task.

SUMMARY

The subject matter of this application describes a system that can monitor characteristics of one or more cameras that are used for road surveillance. Typically, cameras that perform road surveillance are configured to monitor a road for a specific purpose. This specific purpose may be for monitoring an intersection, monitoring a crosswalk, or monitoring vehicles traversing the road, to name a few examples. In order for the camera to capture imagery of a specific area of the road, the cameras need to be positioned in a particular manner or set in a pose such that the camera's field of view covers the specific area of the road to be monitored. Once properly positioned, the cameras can capture imagery of that specific area of the roadway, perform various processes on the imagery, and provide the imagery to various external components to perform processes. However, an issue occurs when the camera's position or pose changes over time due to various factors. These factors can include, for example, vibration, mechanical shock, gravity, weather, etc. As such, the camera's field of view moves with the movement of the camera, and ultimately, the field of view does not include the components desired to be monitored.

In some implementations, the techniques described in this application enable detecting a change in the camera's position on a continuous basis. Specifically, the system can initially calibrate the camera to identify optical characteristics of the camera. The optical characteristics can include, for example, a focal length, skew coefficients, camera resolution, camera responsiveness, and a number of defined pixels, to name a few examples. The camera is initially calibrated to ensure it can view objects in its desired field with focus and clarity. After initial calibration, the system can perform georeferencing of the camera. Specifically, the system performs georeferencing by matching pixels of an image to corresponding geographic locations. The system can obtain additional imagery from external cameras to aid with the georeferencing process. Specifically, these external cameras can be satellites, UAVs, or other remote sensing components that monitor the same viewing area as the camera and record aerial images of the viewing area. The georeferencing can be performed by projections of the images onto the aerial images or three-dimensional maps, estimations of the images to their corresponding geospatial coordinates through matrix calculations, and other techniques as will be described below. These two different calibrations can be performed via coordinate transformations so the camera's field of view can be mapped to a specific location or region on Earth.

In response to calibrating the camera's optical and geo-reference parameters, the system can seek to identify landmarks in one or more frames of the camera's field of view. Specifically, the system can identify landmarks in the frames of the camera's field of view using supervised and unsupervised learning. The identified landmarks are later used to estimate the position and pose of the camera and whether the camera has changed its position and/or pose over a period of time. The system can identify landmarks using supervised learning by using fiducials in an image. Specifically, a fiducial can be an object or an element that is used as a point of reference in the image.

In this system for monitoring roadways, a fiducial can be a landmark that does not change from frame to frame of multiple images. For example, the fiducial can be a geographic landmark, e.g., mountain, hill, a rock, etc., lane lines on a road, light poles, sidewalks, and other features. In this manner, the system can detect these features in the camera and can apply a coordinate system to these features. For example, the system can select one or more defining features in the image and tag these features with an X, Y, and Z coordinate system. These coordinates aid the system in identifying where these features are located in the image as well as on a geographic scale.

Additionally, the system can identify landmarks using an unsupervised learning method. In some implementations, the unsupervised learning method seeks to monitor the drift of identified features in the image over an aggregation of images. This drift can correspond with a pose and/or position change of the camera and can be continuously monitored over time. Specifically, in the unsupervised learning method, the system can acquire one or more images of the camera and seek to identify the invariance in the acquired images. The invariance are the elements or objects that do not change or change positions from image to image. These images recorded from the camera are then transformed into a new image projection for processing. For example, the system can project the images recorded from the camera from an orthogonal vector to a bird's eye view vector.

In response to transforming the image, the system can perform an additional transformation on the earlier transformed image. For example, the system can apply a rasterization technique on the bird's eye view vector. The rasterization technique enables the system to analyze each image frame as a vector of red, green, and blue (RGB) colors and their geometric components. The system can perform the rasterization technique on each image frame recorded from the camera.

In some implementations, the system can identify features of each rasterized image frame. For example, the system may identify various features that include contours, edges, color spaces, change in color, and stability of color space, to name a few. Additionally, the system can identify measures of sameness and measures of difference between subsequent rasterized images. The measures of sameness and difference between subsequent rasterized images can enable the system to identify or estimate a pose change of the camera from its initial calibration.

In some implementations, the system can compare features identified from the supervised learning and features identified from the unsupervised learning between subsequent frames to estimate a pose change of the camera. For example, the system can use the features identified from the supervised learning to reinforce the feature detections in the unsupervised learning method. This may include labeling features as a pole, a landmark, or some other feature, to name a few examples. In response, the system can determine whether these features move their position or location between subsequent rasterized images. Consequently, if the system detects fiducial location movement between subsequent rasterized images, the system can determine that the camera has changed its position. In some implementations, the system may compare the fiducial location movement to a threshold value to enhance the detection. If the movement is greater than a threshold value, then the system can perform a recalibration to adjust the position of the camera. For example, the recalibration may involve a physical recalibration that of the camera. If the movement is less than a threshold value, then the system can perform a transformation of the camera's field of view to a specific coordinate reference and perform image stabilization.

In one general aspect, a method is performed by one or more processors. The method includes: obtaining, by one or more processors, a plurality of first image frames from a camera monitoring a specific geographical area; for each first image frame of the plurality of first image frames: generating, by the one or more processors, a second image frame from the first image frame by adjusting a viewpoint of the first image frame; generating, by the one or more processors, a third image frame from the second image frame by rasterizing the second image frame; identifying, by the one or more processors, photonic content in the third image frame; determining, by the one or more processors, one or more invariant components in a plurality of third image frames based on the photonic content identified in subsequent third image frames; determining, by the one or more processors, one or more position changes of the camera by identifying one or more position changes of the one or more invariant components in the subsequent third image frames; and in response to determining the one or more position changes of the camera, adjusting, by the one or more processors, a position of the camera.

Other embodiments of this and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The foregoing and other embodiments can each optionally include one or more of the following features, alone or in combination. For example, one embodiment includes all the following features in combination.

In some implementations, the method includes wherein obtaining the plurality of first image frames from the camera monitoring the specific geographic area further includes: determining, by the one or more processors, one or more characteristics of the camera based on content of the plurality of first image frames; and adjusting, by the one or more processors, the one or more characteristics of the camera for monitoring the specific geographical area.

In some implementations, the methods includes wherein obtaining, by the one or more processors, a plurality of fourth image frames of the specific geographic area, wherein each fourth image frame of the plurality of fourth image frames include content of the specific geographical area and imagery of the camera; identifying, by the one or more processors, one or more geographical components in each first image frame of the plurality of first image frames using geographical content from the plurality of fourth image frames; and determining, by the one or more processors, a geographical field of view of the camera based on the one or more geographical components in each first image frame of the plurality of first image frames.

In some implementations, the method includes wherein the plurality of fourth image frames are obtained from at least one of a satellite, an unmanned aerial vehicle, and an airplane.

In some implementations, the method includes, wherein generating the second image frame from the first image frame by adjusting the viewpoint of the first image frame further includes: transposing, by the one or more processors, the first image frame by an orthogonal projection to the second image frame, wherein the second image frame is a 90 degree rotated viewpoint of the first image frame; and assigning, by the one or more processors, data indicative of cardinality to the second image frame.

In some implementations, the method includes wherein identifying the photonic content in the third image frame further includes: identifying, by the one or more processors, one or more edges in the third image frame; identifying, by the one or more processors, one or more contours in the third image frame; and identifying, by the one or more processors, a specific color in the third image frame.

In some implementations, the method includes wherein determining the one or more invariant components in the plurality of third image frames based on the photonic content identified in subsequent third image frames further includes: obtaining, by the one or more processors, the plurality of third image frames by aggregating each subsequent third image frame; and detecting, by the one or more processors, one or more static features in each of the plurality of third image frames by (i) comparing features between subsequent third image frames, (ii) identifying the one or more static features between the subsequent third image frames of the features that do not change location, and (iii) identifying one or more non static features between the subsequent third image frames of the features that do change location.

In some implementations, the method includes wherein determining the one or more position changes of the camera by identifying the one or more position changes of the one or more invariant components in the subsequent third image frames further includes: determining, by the one or more processors, a location for each of the one or more static features in the plurality of third image frames; for each third image frame of the plurality of third image frames: determining, by the one or more processors, a difference amount between the location of each of the one or more static features in between an initial third image frame and a subsequent third image frame; comparing, by the one or more processors, the difference amount to a threshold value; and in response to determining the difference amount satisfies the threshold value, identifying, by the one or more processors, a position change of the camera.

In some implementations, the method includes wherein determining the one or more position changes of the camera by identifying the one or more position changes of the one or more invariant components in the subsequent third image frames further includes: determining, by the one or more processors, a location for each of the one or more static features in the plurality of third image frames; for each third image frame of the plurality of third image frames: determining, by the one or more processors, a difference amount between the location of each of the one or more static features in between the third image frame and an initial raster frame; comparing, by the one or more processors, the difference amount to a threshold value; and in response to determining the difference amount satisfies the threshold value, identifying, by the one or more processors, a position change of the camera from an initial calibrated position.

In some implementations, the method includes wherein adjusting the position of the camera further includes at least one of: recalibrating, by the one or more processors, optical characteristics of the camera to match to an initial calibrated position of the camera; or adjusting, by the one or more processors, the position of the camera to the initial calibrated position of the camera.

In some implementations, the method includes wherein the one or more invariant components represent geographic components including at least one of a pole, a lane marker, a hill, a median, crosswalks, mountain, and a tree.

The subject matter described in this specification can be implemented in various embodiments and may result in one or more of the following advantages. In some implementations, the system can adjust position changes of a camera without physical or manual adjustments from an external party. Moreover, this system is advantageous because the processes of identifying landmarks in an unsupervised and supervised fashion can be used to estimate position changes of the camera from a camera's feed alone. Specifically, a system can analyze one or more images captured by a camera over a period of time to determine how a camera's position has changed. This position estimate can be automatically determined by the system without an operator manually reviewing the image feed or manually viewing the camera itself and detecting an adjustment to the camera. The system can rely on contours, edges, and other stagnant or invariant features, e.g., optical content, of various images to identify whether a camera's position has changed, which can be monitored on a continuous basis. This ensures long-term camera position stability.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 is a flow diagram that illustrates an example of a process for estimating a pose change of a camera that is used for roadway surveillance.

Like reference numbers and designations in the various drawings indicate like elements.

DETAILED DESCRIPTION

Figure 1A:
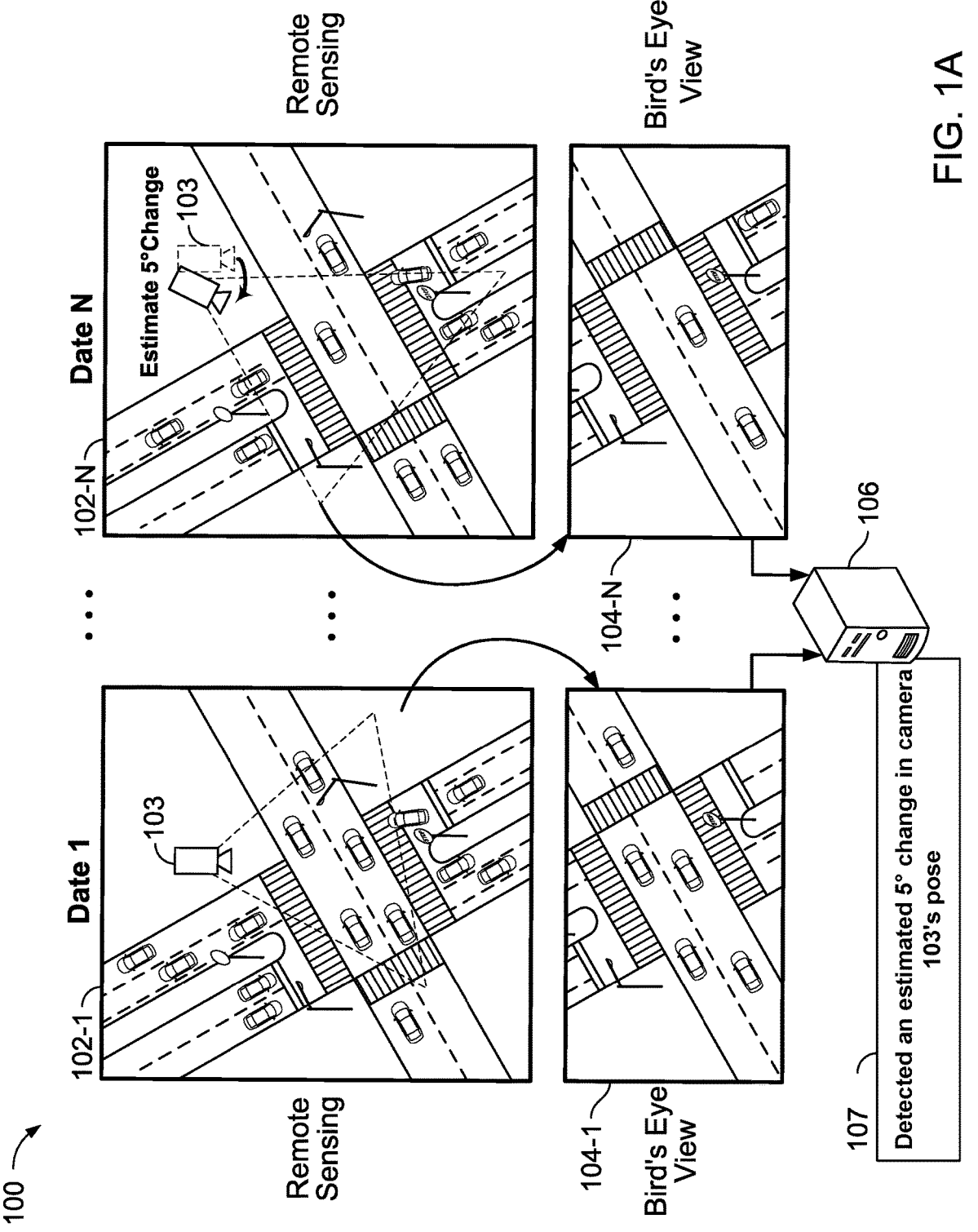
FIGS. 1A-1B are block diagrams that illustrate example systems for monitoring characteristics of one or more cameras that are used for roadway surveillance.

FIG. 1A is a block diagram that illustrates an example system 100 for monitoring characteristics of one or more cameras that are used for roadway surveillance. The system 100 enables a server to monitor one or more cameras in an environment that is used for road surveillance. Specifically, the system 100 can include a server 106, one or more cameras deployed along a roadway, one or more vehicles traversing a roadway, and various networks that enable the devices to communicate with one another. The one or more cameras can monitor various portions of a roadway, e.g., overlapping or different portion, and can include other sensors.

The system 100 illustrates a camera 103 monitoring an intersection of a roadway. However, additional cameras are also possible for monitoring the roadway. Additionally, the intersection monitored by the camera is shown with two lanes with opposing directions of traffic. However, the camera 103 can also monitor other roadways, such as, highways, off-ramps, on-ramps, freeways, expressways, unpaved roads, and any other road type. Moreover, the roadway monitored by the camera 103 (and other cameras) can include one or more opposing lanes of traffic and one or more lanes of traffic traveling in the same direction.

Generally, the example system 100 illustrates one or more cameras, e.g., camera 103, monitoring vehicles traversing the roadway. The one or more cameras can be placed along side of the roadway at predetermined distances from one another such that their fields of view overlap or juxtapose with one other. The one or more cameras can be used for road surveillance in various applications. These applications can include, estimating characteristics of vehicles on the roadway, estimating vehicle movements to aid in designing future roadway systems that match to the estimated vehicle movements, and monitoring relationships between vehicles moving on the roadway, to name a few examples. The one or more cameras are typically installed with a fixed field of view for monitoring a designated portion of roadway.

For example, the one or more cameras may be installed on the roadway such that their field of view is in an alignment that is parallel to the roadway. In another example, the one or more cameras may be installed on the roadway such that their field of view is in an alignment that is perpendicular to the roadway to monitor vehicles traversing on the roadway and passing through their intended field of view. However, issues arise when performing road surveillance when a positon or a pose of the one or more cameras change over time due to various factors.

Specifically, the one or more cameras may change their position due to the various factors, which ultimately affects the performance of road surveillance. For example, vibration of vehicle movements on the roadway may disturb the pose of the camera over time. In another example, a mechanical or physical shock can adjust the camera's pose to a point that the camera is no longer operational or adjusted its field of view from a desired field of view. In another example, gravity may slowly pull the camera down over time, which changes the camera's pose. In another example, inclement weather can disturb and affect the camera's pose. In response, the one or more cameras may no longer effectively perform road surveillance because their field of view has changed from a desirable state to an undesirable state. Said another way, the one or more cameras may now monitor areas different from or separate to the roadway 103 they were not intended to monitor due to the various factors.

In some implementations, cameras can be initially installed adjacent to a roadway to provide data of identified objects in a real world environment. Once installed, a camera can capture imagery that can be analyzed to provide indications of where objects appear in the real world. For example, camera 103 can be placed at the corner of the intersection shown in image 102-1.

Camera 103 can record footage from its field of view. The recorded video footage may illustrate various objects, such as road actors, lane lines, poles, lights, people, pets, and other objects, to name a few examples. The camera 103 can provide its recorded footage back to server 106 over a network for processing.

In some implementations, the server 106 can perform various functions on the obtained footage from camera 103. The functions can include identifying locations of the road actors as they move on the roadway, locations of the lane lines in the video footage, locations of pets walking along the sidewalk of the roadway, and other examples. The server 106 can apply classifiers, object detection algorithms, and other detection algorithms to identify objects in the image and their corresponding locations.

For example, one object in the obtained video footage may be identified as a dog and located in the footage at the X-Y locational coordinates of (1.0456, 3.4564). However, this information may be meaningless without further context that describes where the dog is located in terms of real world coordinates. As such, the server 106 may perform one or more transformations to transform the locations of the objects in the images to locations in the real world environment.

In an example, the server 106 can perform a transformation on the X-Y locational coordinates of the dog in the image to locational coordinates of the dog in the real world environment using a frame of reference of the camera 103. Specifically, the server 106 may determine characteristics of the camera 103 that include, for example, the camera 103's position in the real world environment, such as its locational coordinates on the Earth, the camera 103's optical characteristics, and the region with it is currently monitoring. The server 106 can translate locational coordinates of the dog in the image to locational coordinates in the real world environment using the characteristics of the camera 103. For example, the server 106 can translate the dog's locational coordinates in the image (1.0456, 3.4564) to locational coordinates in the real world to a latitude and longitude (40.785091, −73.968285). This feature enables the server 106 to track location of objects in the footage to their real-world location.

However, when the camera 103 has adjusted its position due to gravity, mechanical shock, or weather, to name a few examples, the translation of the dog's locational coordinates in the image can change drastically. For example, based on the camera's incorrect pose or position, the server 106 can determine the dog's locational coordinates in the image to be (0.0993, 2.0123), which translates to the dog's incorrect locational coordinates in the real world as (40.748817, −73.985428). Assuming, the dog has not moved between these images but the camera has changed its position, the incorrect locational coordinates of (40.748817, −73.985428) are different from the correct locational coordinates of (40.785091, −73.968285). As such, the system 100 seeks to detect a change in the camera's pose based on the camera's feed alone and adjust the camera's pose to avoid future errors in identifying real-world locations of objects in the feed.

In some implementations, the server 106 can perform calibration and transformation to estimate pose changes of camera 103. The server 106 can analyze recorded footage from various sources of a particular roadway. Specifically, the server 106 can obtain recorded footage, e.g., one or more images or a video stream, from the various sources that includes remote sensing data and data obtained from a "bird's eye view." The bird's eye view images can represent images captured from an elevated view above an object, as if captured from a flying bird. For example, cameras can capture bird's eye view images of an area or object from a 45-degree angle above the area or object. The remote sensing data, which can be an aerial view, can represent vertical aerial photography, in which photos are typically taken from a straight down point of view.

As illustrated in system 100, images 102-1 through 102-N are remote sensing data images (collectively "remote sensing images 102") captured by one or more cameras. Similarly, images 104-1 through 104-N are bird's eye view images (collectively "bird's eye view images 104") captured by one or more cameras. Aerial devices, such as, a plane, a drone, a helicopter, or another device that looks vertically down upon an area or object can capture the remote sensing data images. One or more satellites orbiting the Earth can also capture the remote sensing images 102.

The bird's eye view images 104 can be captured by, for example, camera 103 positioned adjacent to a roadway, other cameras spaced a predetermined distance apart from camera 103, and cameras positioned on the roadway itself. In some examples, the bird's eye view images 104 can represent a set of images that have been transposed to the bird's eye view. Specifically, the set of images can represent a set of two-dimensional images that have been transposed, or rotated 90 degrees to the bird's eye view. These two-dimensional images can be captured from cameras that are aligned in a parallel, perpendicular, angled, or other manner with the roadway. The server 106 can then transpose these two-dimensional images to the bird's eye view.

The remote sensing images 102 and the bird's eye view images 104 can be captured at various points in time. For example, each remote sensing image corresponds with a particular date. In one example, remote sensing image 102-1 can correspond with date 1, e.g., Jan. 1, 2020, and remote sensing image 102-N can correspond with date N, e.g., Jan. 1, 2022. Similarly, the bird's eye view image 104-1 can correspond with a different date 1, e.g., Jan. 2, 2020, and bird's eye view image 104-N can correspond with a different date N, e.g., Jan. 2, 2022. In other examples, the dates between the remote sensing images 102 and bird's eye view images 104 can be similar.

The server 106 can obtain the remote sensing image 102 and the bird's eye view images 104 to estimate a pose change of a camera 103. For example, as shown in 107, the server 106 detected a 5-degree pose change of camera 103 from its target pose. In response to estimating the pose change, the server 106 can perform stabilization to adjust the camera 103's pose. In some implementations, the server 106 can transmit a request for a user to adjust the camera 103 based on the detected pose change.

Figure 1B:
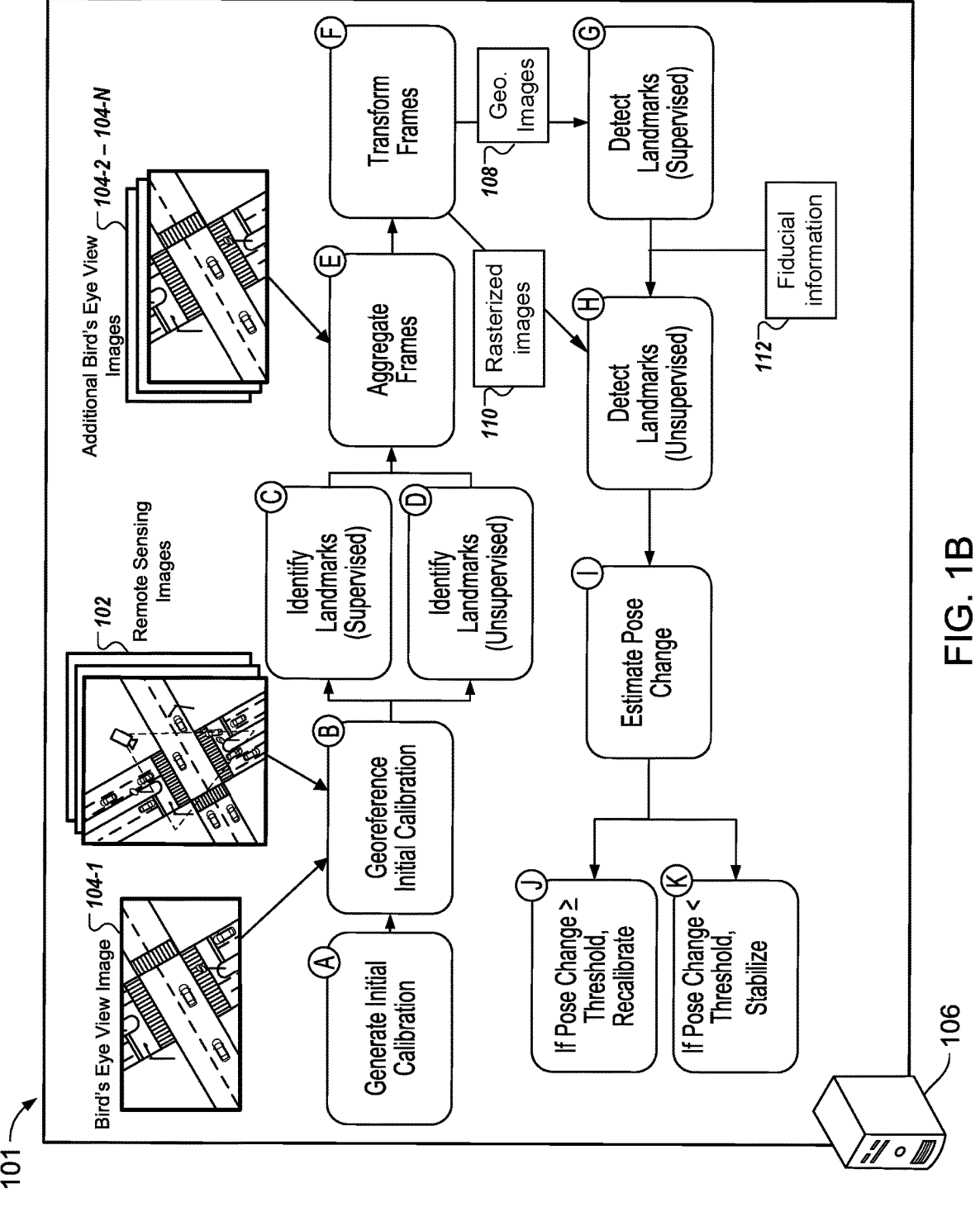

FIG. 1B is another block diagram that illustrates an example system 101 for monitoring characteristics of one or more cameras that are used for roadway surveillance. System 101 is a continuation of system 100. Specifically, system 101 illustrates the components and functions performed to detect a pose or position change of a camera. FIG. 1B illustrates various operations in stages (A) to (K), which can be performed in the sequence indicated, in another sequence, with more stages, or with fewer stages.

During stage (A), the server 106 can perform an initial calibration on the camera 103. In response to obtaining the remote sensing images 102 and the bird's eye view image 104-1 of a particular environment, the server 106 can perform the initial calibration of the camera 103. The server 106 can perform the initial calibration of the camera 103 by analyzing the camera 103's current optical characteristics.

Analyzing the current optical characteristics can include, for example, determining a state of the optical characteristics and determining whether the optical characteristics need to be changed to new values based on the environment being examined. For example, the optical characteristics of camera 103 can include its focal length, skew coefficients, camera resolution, responsiveness in image capture, and a number of defined pixels identified from the bird's eye view images, to name a few examples.

The server 106 can determine these optical characteristics by transmitting a status request to the camera 103 over a network. In response, the server 106 can receive the current optical characteristics from camera 103 over the network. Then, the optical characteristics can be analyzed to determine whether they meet the desired characteristics for monitoring the particular roadway.

The server 106 may adjust the camera 103's optical characteristics to ensure the objects in the camera's field of view are observable with focus and clarity. For example, the server 106 may determine that a focal length of the camera 103 is currently at 100 mm instead of a desired focal length of 30 mm. In response, the server 106 can instruct camera 103 to adjust its focal length and obtain additional camera footage based on the newly adjusted focal length. In another example, the server 106 may determine that the camera 103's resolution settings, typically expressed in megapixels (MP), are too low and need to be increased for performing the road surveillance. The server 106 can also adjust other parameters of the camera 103 to ensure the camera 103 can properly capture the one or more objects in its desired field of view.

During stage (B), the server 106 can perform an initial georeference calibration of camera 103. In response to initially calibrating the camera 103, the server 106 can perform the initial georeference in the camera to identify geographic locations illustrated in the bird's eye view image 104-1. Specifically, the server 106 seeks to match the data in the bird's eye view image 104-1 to corresponding geographic locations in the real-world environment. In order for the server 106 to perform image to geographic location matching, the server 106 can rely on the remote sensing images 102.

As previously mentioned, the remote sensing images 102 can include images that were captured at a current or prior time to the bird's eye view image 104-1 and include a similar region captured to the bird's eye view image 104-1. Moreover, the remote sensing images 102 can include images captured from aerial cameras, such as satellites, UAVs, planes, or were transposed by the server 106 from various two-dimensional images. The remote sensing images 102 can additionally include geographic locations that define the locations shown in the image. For example, each remote sensing image can include a latitude and longitude for each pixel to define the geographic location shown in the image.

In some implementations, the server 106 can perform the initial georeferencing calibration of camera 103 on the data from the bird's eye view image 104-1. The server 106 can rely on the camera 103's current optical characteristics when it captured the bird's eye view image 104-1. The server 106 can then analyze the camera 103's position, orientation, its field of view, and other optical characteristics to project the bird's eye view image 104-1 data to data illustrated in the remote sensing images 102.

Specifically, the server 106 can rely on one or more optimization algorithms that seek to match locations shown in the bird's eye view image 104-1 to locations shown in the remote sensing images 102. For example, the server 106 can execute one or more optimization algorithms that attempt to match pixels in the bird's eye view image 104-1 to pixels in the remote sensing image 102 in order to identify locational coordinates of the pixels in the former. The data in the remote sensing images 102 may already include or be indexed with locational information, e.g., latitude and longitude information for each pixel or luminance data. The server 106 may iteratively perform the optimization algorithms until a number of locations have been identified in the bird's eye view image 104-1.

In some implementations, the server 106 can perform the initial georeferencing calibration of camera 103 by projecting the data of the bird's eye view image 104-1. For example, the server 106 can project the pixels of the bird's eye view image 104-1 onto the pixels of each of the remote sensing images 102. In this manner, the server 106 can perform an optimization mapping between the sets of data in a manner that observes commonalities between the images and seeks to match the data based on commonalities.

The match can be identified based on a comparison of RGB values between pixels and threshold values. For example, the server 106 may identify a pixel from the bird's eye view image 104-1 is a 98% match to one or more pixels of one or more of the remote sensing images 102, which is greater than (or equal to) a threshold value of 90%. If the comparison is less than the threshold value, then the server 106 can move on to another set of pixels for comparison. Based on the comparison, the server 106 can identify locational coordinates for pixels in the bird's eye view image 104-1.

In some implementations, the server 106 can perform other methods for georeferencing the bird's eye view image 104-1. Specifically, the server 106 can perform matrix multiplication, direct georeferencing, indirect georeferencing, georeferencing using 3D point clouds, and other georeferencing methods.

During stage (C), the server 106 can identify landmarks in the georeferenced image using a supervised method. The georeferenced image can include the bird's eye view image 104-1 that includes locational information, as a result of the processes performed in stage (B). Specifically, the server 106 can analyze the georeferenced image to identify one or more fiducials in the georeferenced image.

A fiducial can be an object, element, or component that is used as a point of reference in the image. For example, a fiducial of a georeferenced image can include a geographic landmark, e.g., a mountain, a hill, a rock, an ocean, or another geographic landmark. Similarly, a fiducial can include a man-made object that remains stationary between subsequent images. For example, a man-made fiducial can include lane lines on a road, a light fixture, pole, a stop sign, sidewalks, curbs, grass medians between lanes, and other man-made object that are stationary.

The server 106 can augment the process of identifying fiducials in the georeferenced image by acquiring additional georeferenced images and comparing identified fiducials from those georeferenced images to the initial georeferenced image. Said another way, the server 106 can compare objects between each image of the georeference images to identify fiducials that remain stationary and do not change its position or attributes. The server 106 may determine a fiducial in the georeferenced image by identifying an object that does not change position between these contiguous georeferenced images. The contiguous georeferenced images can include one or georeferenced images linked by timestamp in ascending order or descending order from the time in which the images were captured by camera 103 or other cameras. For example, three contiguous georeferenced images can include image 1 captured on Jan. 1, 2021, image 2 captured on Jan. 2, 2021, and image 3 captured on Jan. 3, 2021.

In some implementations, the server 106 can utilize algorithms to detect one or more fiducials in a georeferenced image. The server 106 can use one or more trained machine-learning models, classifiers, object detection classifiers, and other algorithms to identify one or more fiducials in the georeferenced image. In response to identifying the one or more fiducials in the georeferenced images, the server 106 can label the identified fiducials in each georeferenced image with the corresponding locational coordinates identified in stage (B).

In one example, the server 106 can identify a traffic stop sign in georeferenced image. In response, the server 106 can identify the pixel coordinates of the traffic stop sign in the georeferenced image and can translate the pixel coordinates of the traffic stop sign to locational coordinates identified by the georeferenced image. For example, the server 106 can identify the pixel coordinates of the traffic stop sign to be (0.4551, 0.23451) and then translate the pixel coordinates to the georeferenced coordinates (32.715736, −117.161087) of the traffic stop sign in a particular georeferenced image.

Continuing with the example from above, the server 106 can label the identified traffic stop sign in each georeferenced image frame with (i) the pixel coordinates of the traffic stop sign in the image, (ii) the georeferenced coordinates of the traffic stop sign, and (iii) an indication that the traffic stop sign is a fiducial. Generally, the server 106 can identify and label each fiducial in each georeferenced image with its (i) pixel coordinates, (ii) georeferenced coordinates, and (iii) a fiducial indication. The server 106 can further label the one or more identified fiducials in each georeferenced image as objects that are invariant or do not move between contiguous georeferenced images. Not only would their coordinate locations in the real world remain the same between each georeferenced image frame but also the pixel coordinates would not change between subsequent images, so long as the camera 103 remains stationary and its pose does not change during multiple capture operations.

During stage (D), the server 106 can identify landmarks in the georeferenced image using an unsupervised method. Specifically, the server 106 can analyze the georeferenced image and identify various features that correspond to invariant objects. In response, the server 106 can label these features as invariant objects to assist with identifying other landmarks in future georeferenced images.

In some implementations, the server 106 can seek to identify invariant and variant features in the georeferenced image. The invariant features can represent objects in the georeferenced image that appear to be stationary. The variant features can represent objects in the georeferenced image that move or are not stationary. The invariant features can include, for example, lane lines, stoplights, poles, sidewalks, curbs, mountains, hills, and other objects. The variant features can include, for example, people, vehicles, pets, trees with falling leaves, and other objects that can move over a period of time. In response to identifying the invariant and variant features, the server 106 can estimate the pose or position change of the camera 103 over time, as will be further described below.

Specifically, the server 106 can transform each of the geographic images in order to identify its invariant and variant features. First, the server 106 can transpose the geographic image to a vertical projection. The vertical projection rotates the geographic image by a particular degree amount, e.g., 10, 45, or 90 degrees, so that a viewpoint of the image changes to a vertical view. Moreover, the vertical projection can preserve the content of the geographic image. For example, the content of the geographic image can include the data from the captured image and the locational information for each component of the image. However, in some cases, the vertical projection may reduce a size of the geographic image. In some cases, the vertical projection may not reduce a size of the geographic image.

In some implementations, the server 106 can assign cardinality directions to the transposed images. For example, the server can assign North, South, East, and West directions on each of the transposed images. The server assigns cardinality to aid with identifying fiducials and other invariant objects in the images. Moreover, the cardinality aids the server in filtering out objects, e.g., labeling the objects as variant, that may be in the same location across multiple images but adjusts its orientation. The server can identify its orientation and any adjustments in orientation by analyzing whether an object has changed its orientation from North to South, East to West, West to East, Northwest to Northeast, or others, to name a few examples.

In some implementations, the server 106 can perform a rasterization on the transposed geographic images. The server 106 can perform a rasterization by transforming a reflectance and luminosity of objects within the image to pixel values. The rasterization frame can include the converted pixel values. For example, the reflectance and luminosity of objects within a particular image, e.g., the geographic image, can be converted to Red-Green-Blue (RGB) values. The server 106 can use weights, RGB calculations, and optics-to-color calculations to perform the conversion, to name a few examples. These RGB values or pixel values of the rasterized image can be displayed on computer screens, client devices, displays, and other devices. The rasterized form of the geographic image can also include the locational information generated above. Thus, the server 106 can generate a rasterized form of the geographic image.

In response to rasterizing each of the geographic images, the server 106 can seek to identify landmarks using data from the rasterized image. First, the server 106 can analyze a rasterized image to identify its optical or photonic content, such as discontinuities, contours, edges, colors, and color changes, to name a few examples. Moreover, the server 106 can identify textures, gradients, and other content found in the rasterized image. The optical or photonic content can represent various elements identified in the real world. For instance, the server 106 may identify contours, edges, textures, and other characteristics of the rasterized image that represent lane lines, stoplights, poles, and sidewalks, to name some examples.

In response to rasterizing and identifying landmarks in the rasterized image, the server 106 can label the invariant and variant features of the rasterized image. For example, the server 106 can determine that one identifiable landmark or invariant feature has a longitude and latitude of (38.900497, −77.007507). Additionally, the server 106 can determine that another identifiable landmark or invariant feature has a longitude and latitude of (38.83023, −77.007507).

The server 106 can also label longitude and latitude of objects or components of the rasterized image that appear to move or be variant. For example, the server 106 can determine and provide coordinate information of likely moving contours, moving edges, and other potentially moving features found in the image. Although these moving components may be not be relied on for the identified landmarks, the server 106 can label these moving photonic content as non-stationary or "variant" features to aid in determining landmarks from subsequent images, as will be further described below.

During stage (E), the server 106 can aggregate multiple bird's eye view images 104-2 through 104-N that illustrate a similar location as the location shown in the bird's eye view image 104-1. For example, the server 106 can acquire additional bird's eye view imagery 104-2 through 104-N to improve the detection and identification of landmarks shown in bird's eye view image 104-1 and other images. For example, the server 106 may acquire one or more images 104-2 through 104-N from camera 103, since camera 103 is monitoring and capturing imagery of a similar location shown in bird's eye view image 104-1.

The server 106 can use the image capture date of bird's eye view image 104-1 to acquire different images. For example, the capture date of bird's eye view image 104-1 can be Apr. 2, 2021. Then, the server 106 can acquire a predetermined number, e.g., N=90, bird's eye view images 104-2 through 104-N, from Jan. 1, 2021 to Apr. 1, 2021, one image from each day. In some examples, the camera 103 may capture 10 images each day, and as such, the server 106 can acquire 900 images from Jan. 1, 2021 to Apr. 1, 2021. In some examples, the server 106 can acquire imagery from camera 103 from after the capture date of the bird's eye view image 104-1 if the capture date is before a current date. For example, the server 106 can acquire imagery from camera 103 from Jan. 1, 2021 to Apr. 1, 2021 and from Apr. 1, 2021 to Dec. 1, 2021, if the current date is Jan. 1, 2022.

In some implementations, the server 106 can benefit from including a variety of images showing the same location from different dates. The more images provided showing a similar location, the more likely the server 106 can augment its identification process because more images may show more variability of its objects. The variability can come from cars moving, people walking, pets moving through photos, trees dying over time, installation of manmade objects, and others, to name a few examples. By obtaining more images and recognizing variability in more images, the server 106 can improve its identification of objects that are stationary or invariant by more accurately filtering objects that are not stationary. For example, the server can identify landmarks using the supervised and unsupervised methods on the bird's eye view images 104-2 through 104-N. Ultimately, by enhancing the identification of objects that are invariant by purging or filtering the variant objects from the images, the server 106 can improve its detection of landmarks. Subsequently, the server 106 can more accurately estimate a pose change of camera 103 when the detection of the landmarks is more accurate.

During stage (F), the server 106 can transform each of the newly acquired aggregated images 104-2 through 104-N. Specifically, the server 106 can transform each of the newly acquired aggregated images 104-2 through 104-N in a manner that was similarly described with respect to stages (B) and (D). For example, the server 106 can first perform a georeferencing on each of the aggregated images 104-2 through 104-N, as similarly performed with respect to stage (B).

In some implementations, the server 106 can use the locations identified in the bird's eye view image 104-1 to identify geographic locations shown in each of the aggregated images 104-2 through 104-N. For example, the server 106 can compare the luminance and reflectance information in the bird's eye view image 104-1 to the luminance and reflectance information in the aggregated images 104-2 through 104-N. If the comparison results in similar luminance and reflectance values at a particular location in the images within a threshold value, e.g., 90%, then the server 106 can assign the corresponding locational information from the particular location of the bird's eye view image 104-1 to the particular location in each of the aggregated images 104-2 through 104-N.

In some implementations, the server 106 can use the remote sensing images 102 to identify geographic locations shown in the acquired aggregated images 104-2 through 104-N. If the camera 103 changes its pose or position over time, such as over the time frame identified by the aggregated images 104-2 through 104-N, then comparing the acquired aggregated images 104-2 through 104-N to the bird's eye view image 104-1 may not produce comparable results because the images may be distinctly different due to the camera's pose or position change. As a result, the server 106 can use the remote sensing images 102 for comparison to the acquired aggregated images 104-2 through 104-N to identify locational or georeferencing information in the latter images, as similarly performed during stage (B). In this manner, the server 106 can identify locational information, e.g., latitude and longitudinal coordinates, in each of the acquired aggregated images 104-2 through 104-N. The server 106 can generate the georeferenced images 108 that include the acquired aggregated images 104-2 through 104-N with corresponding location information.

In response to generating the georeferenced images 108, the server 106 can generate rasterized images 110 from the georeferenced images 108. In some implementations, the server 106 can generate the rasterized images 110 by transforming each of the georeferenced images 108. As similarly performed in stage (D), the server 106 can transpose each georeferenced image of the georeferenced images 108 to a vertical projection. The vertical projection rotates the geographic image by a particular degree amount, e.g., 10, 45, or 90 degrees, so that a viewpoint of the image changes to a vertical view. Moreover, the vertical projection can preserve the content of the geographic image. Specifically, the vertical projection image of each georeferenced image can include the same locational information that was generated in the georeferenced images 108.

Additionally, the server 106 can perform a rasterization on each of the transposed georeferenced images. Specifically, the server 106 can generate a rasterized form of each of the georeferenced images. The rasterized form of each georeferenced image can include RGB values or pixel values of the reflectance and luminosity values in the corresponding georeferenced image. The server 106 can generate the rasterized images 110 by performing the rasterization process on each of the georeferenced images 108.

During stage (G), the server 106 can detect landmarks in the georeferenced images 108 using the supervised method. Specifically, the server 106 can detect landmarks in each of the georeferenced images 108 in a manner similar to the process performed in stage (C). The landmarks can be fiducials that are invariant between contiguous georeferenced images 108. For example, the fiducials can include a geographic landmark and various man-made objects. The server 106 can detect the fiducials or landmarks in each of the georeferenced images 108.

In some implementations, the server 106 can enhance its detection of fiducials in the supervised method by comparing fiducials between subsequent contiguous georeferenced images 108. The server 106 can identify one or more landmarks or fiducials in a first georeferenced image, identify one or more fiducials in a second georeferenced image, and determine whether the fiducials between the first geo-referenced image and the second georeferenced image are similar. For example, the first georeferenced image may have been captured by camera 103 on Jan. 1, 2021 and the second georeferenced image may have been captured by camera 103 on Jan. 2, 2021. In this manner the two images are contiguous and can include similar objects. In this example, the server 106 may have identified a pole in the first georeferenced image and a pole in the second georef-erenced image. The server 106 can compare whether the poles of each respective image is the same based on the location of each pole in their respective image and an image comparison between the two poles. If the locations of the poles in each respective image does not differ by more than a threshold amount, e.g., 5 pixels in the X or Y direction, and the image comparison indicates the poles are the same, then the server 106 can indicate that a fiducial has in fact been found.

In another example, the server 106 may identify a fiducial that appears to be a stop sign in the first georeferenced image and a fiducial in the second georeferenced image that appears to be a stop sign. The server 106 may compare the location of the alleged stop sign in the first georeferenced image and the location of the alleged stop sign in the second georeferenced image, and determine that the locations are similar, e.g., within a threshold pixel distance of one another. When the server 106 performs the image comparison between the two alleged stop signs, the server 106 may not be able to accurately identify differences between the two objects due to sun glare on the surface of the lens of camera 103. In this case, the server 106 may believe it has identified another fiducial, e.g., a stop sign. However, the server 106 may acquire a third and fourth georeferenced image and determine that the location of the identified fiducial appears to be moving and the identified fiducial is not a stop sign as previously determined, but is in fact a moving person. In this case, the server 106 can then determine the object that was originally thought to be a stop sign was in fact a person, and is therefore not a fiducial.

In some implementations, the server 106 can continue to analyze the georeferenced images 108 to identify the fidu-cials. As illustrated in the examples described above, the server 106 can compare potential fiducials between two subsequent georeferenced images. Additionally, the server 106 can compare potential fiducials between two or more georeferenced images in case two georeferenced images are not sufficient to identify fiducials. For example, the server 106 can compare 2, 5, 10, 50, 75, or 1000 georeferenced images to verify the authenticity of one or more fiducials. This process can be performed iteratively over each of the georeferenced images until all of the images have been processed for fiducial identification.

In some implementations, the server 106 can generate fiducial information 112 that represents the identified fidu-cials in each of the georeferenced images 108. Specifically, the fiducial information 112 can include the locational coordinates, data identifying the fiducials, and data identi-fying a georeference image of the georeferenced images 108 in which the fiducial was found. For example, the fiducial information 112 can include the locational coordinates of (32.715736, −117.161087), data identifying the fiducial as a "stop sign," and data identifying the georeference image as image 104-10 on Jan. 11, 2021. In this manner, the server 106 can use the fiducial information 112 to aid in identifying landmarks during the unsupervised process.

During stage (H), the server 106 can detect landmarks in the rasterized images 110 using the unsupervised method.

Specifically, the server 106 can detect landmarks in each of the rasterized images 110 in a manner similar to process performed in stage (D). These landmarks, which have been encoded in the rasterized images, can be fiducials that are invariant between contiguous rasterized images 110. The server 106 can detect fiducials or landmarks in each of the rasterized images 110 by comparing features similar to and different from one another. In response, the server 106 can interpret these encoded fiducials as a means to identify a pose change of a camera.

In some implementations, the server 106 can enhance its detection of fiducials in the unsupervised method by com-paring optical content between subsequent contiguous ras-terized images 110. The server 106 can identify optical content in a first georeferenced image, identify optical content in a second georeferenced image, and determine whether the optical content between the first rasterized image and the second rasterized image correspond to fidu-cials. For example, the server 106 can analyze each of the rasterized images 110 to identify discontinuities, contours, edges, colors, color changes, stability of color changes, and other photonic content. The server 106 can generate data that identifies the optical content for each rasterized image and compare subsequent rasterized images to one another. In some examples, the server 106 can compare optical content information between subsequent rasterized images to one another based on isomorphism and homomorphism.

Isomorphism can represent characteristics between two independent images that have a similar number of charac-teristics, e.g., a number of nodes, a number of edges, a number of connections between nodes and edges, and a number of content, to name a few examples. Homomor-phism includes homologous features that can represent a mathematical mapping between two structures, and in this case, the two structures can be a first rasterization image and a second rasterization image. For example, the server 106 can create a mathematical mapping between features repre-sented by the first rasterization image and the second ras-terization image. The features can include the optical con-tent. The server 106 can determine an isomorphism of the mathematical mapping between the two structures to indi-cate how similar the features are to one another. For example, a high isomorphic score can indicate similar opti-cal content and similar locations of the optical content between two pictures. In this case, the server 106 can determine one or more fiducials from the similar optical content. However, a low isomorphic score can indicate dissimilar optical content and dissimilar locations of the optical content. In this low isomorphic score comparison, the server 106 can determine that these two images have a large number of variant components, making identifying invariant components difficult.

In some implementations, the server 106 can compare the identified optical content between one or more subsequent rasterized images. Specifically, the server 106 can seek to align the rasterized images to see if the optical content similarly compares. These two images may have been captured at different times. As such, the rasterized images may illustrate a grey scaled version the roadway at different times, which can show different vehicles at different places, vehicles driving in different directions, leaves having fallen off trees, and people missing from one of the photos, to name a few examples.

However, invariant objects, e.g., poles, sidewalks, lane lines, and others, may remain in the same place between the rasterized images. The server 106 may identify that at least some of the optical content, e.g., contours, edges, textures, and other characteristics, found in the first rasterized image is not found in the second rasterized image. Alternatively, the server 106 may identify that at least some of the optical content found in the first rasterized image is found in the second rasterized image. In response, the server 106 can label the similarly identifiable optical content in the rasterized images. The server 106 can also avoid labeling the optical content that is different between the two images. The labeling can be performed with locational coordinates and data indicating a likely fiducial has been found.

The server 106 can seek to align one or more rasterized images based on their similar optical content. For example, a first rasterized image captured on Jan. 1, 2021 may include an edge that represents a lane line and a contour that represents an outer perimeter of a vehicle. The server 106 can identify the edge and the contour in the first rasterized image and indicate that these appear to be likely fiducials. Then, the server 106 can obtain a second rasterized image captured on Jan. 2, 2021, and identify from the second rasterized image another edge that represents a lane line and another contour that represents an outer perimeter of a vehicle.

The server 106 can compare the optical content, e.g., edges and contours, between the two rasterized images to determine if their respective optical content can represent a fiducial. The server 106 can determine that the content of the edge and the pixel location of the edge in the first rasterized image match to the content of the edge and the pixel location of the edge in the second rasterized image. In response, the server 106 can identify the detected edge between the two rasterized images as a likely invariant feature.

Additionally, the server 106 can determine that the content of the contour in the first rasterization image matches to the content of the contour in the second rasterization image. However, the server 106 can determine that the location of the contour in the first rasterization image is different from the location of the contour in the second rasterization image. In response to determining that the contour has changed locations between subsequent rasterization images, the server 106 can determine that edge represents an invariant component and the contour represents a variant component.

However, in some cases, the server 106 may further analyze additional subsequent rasterization images to determine whether the contour is in fact a variant component or is the camera capturing the images moving. To identify the former, the server 106 can analyze a multiple subsequent rasterization images and determine if the edge continues to be located in different locations from prior rasterization images. For example, the edge continues to drift across each rasterization image until the edge is no longer identified in a rasterization image. This can indicate to the server 106 that the edge is a car, a person, a pet, or an object floating in the wind.

In some cases, the server 106 can ensure that the edge is in fact moving across the rasterization images and the camera capturing the image is not in fact spinning. For example, if the server 106 can determine one or more fiducials from optical content between multiple subsequent rasterization images in addition to the one identified edge that appears to be changing location between subsequent rasterization images, then the server 106 can determine the edge is in fact a moving object. However, if the server 106 does not identify any fiducials between subsequent rasterization images, then the server 106 can likely determine that the camera capturing the images corresponding to the rasterization images is likely spinning around.

In some implementations, the server 106 can augment the detection of fiducials in the unsupervised method with the data from the fiducial information 112. The data from the fiducial information 112 can include the locational coordinates of a fiducial, data identifying a fiducial, and data identifying a georeference image in which the fiducial was found. The transformation between the georeferenced images 108 and the rasterization images 110 can be a 1-to-1 mapping, so each georeferenced image can correspond to a rasterization image. In this manner, the server 106 can use the fiducial information to guide the server's identification of optical content in the unsupervised method.

For example, the fiducial information 112 can indicate that the server 106 identified a fiducial in the georeferenced image of Feb. 1, 2021 and the fiducial was identified at these pixel coordinates—(0.45676, 1.2345). The server 106 can access the rasterization image that corresponds to the georeferenced image of Feb. 1, 2021 to determine whether optical content exists at the pixel coordinates of (0.45676, 1.2345). If the server 106 determines that optical content does exist at these coordinates, then the server 106 can confirm whether this is in fact a fiducial by comparing the optical content of the rasterization image of Feb. 1, 2021 to subsequent rasterization images before and after Feb. 1, 2021. If the server 106 determines after analyzing a predetermined number rasterization images before and after the Feb. 1, 2021 date that the optical content is in a similar position and includes similar content, then the server 106 can deem that the fiducial indicated by the fiducial information 112 is in fact a fiducial.

However, if the server 106 determines that the fiducial information 112 indicates a location for a potential fiducial and the server 106 cannot find corresponding optical content in similar rasterization images, then the server 106 can remove that fiducial from the fiducial information 112. Moreover, the server 106 can provide data to the one or more trained machine-learning models that were used to identify fiducials as feedback to return the models. Specifically, the data can include an indication that a corresponding location in a rasterization image, e.g., which can translate to a location in a corresponding georeferenced image, and corresponding content does not reflect a fiducial. The server 106 can retrain the trained machine-learning model with this feedback information until the model can effectively not detect a fiducial in the location identified by the corresponding georeferenced image.

In some implementations, the server 106 can iteratively perform the process of identifying landmarks in the unsupervised method. The server 106 can analyze various rasterization images, their optical content, and compare content of the optical content and location of the optical content across the various rasterization images. The server 106 can then label each of the rasterization images 110 and the corresponding georeferenced images 108 with fiducial information if the fiducial information is identified. For example, the labeled fiducial information can indicate locational coordinates of the fiducial and a type of fiducial that is identified.

During stage (I), the server 106 can estimate a pose change of the camera. Specifically, the server 106 can utilize the locations of the fiducials in each of the rasterization images to estimate a pose change of the camera. In some implementations, the server 106 can monitor the estimated pose change of the camera on an iterative basis. For example, the server 106 can monitor the locations of identified fiducials across two, three, four, ten, and up to N number of rasterization images. If the server 106 determines a pose change of the camera that captured the images, which correspond to the rasterization images, then the server 106 can take action to correct the pose change of camera.

For example, the server 106 can analyze two rasterization images—a first rasterization image captured on Jan. 2, 2021 and a second rasterization image captured on Jan. 3, 2021. From the analysis, the server 106 can determine that one fiducial has been identified in the first rasterization image and three fiducials identified in the second rasterization image. The server 106 can then identify locations of the fiducial in the rasterization images. For example, the server 106 can identify locations of ten pixel values in the first rasterization image that correspond to a fiducial, e.g., (0, 1), (0, 2), (0, 3) to (0, 10). Similarly, the server 106 can identify locations of ten pixel values in the second rasterization image that correspond to a fiducial, e.g., (0, 1), (0, 2), (0, 3) to (0, 10). In response, the server 106 can the difference between the locations of ten pixel values in the first rasterization image and the locations of ten pixel values in the second rasterization image is zero or does not change. In this case, the server 106 may determine that the camera has not changed positions.

In some examples, the server 106 can determine that one fiducial has been identified in a first rasterization image of Jan. 20, 2021 and a similar fiducial has been identified in a second rasterization image of Jan. 21, 2021. For example, the server 106 can identify locations of four pixel values in the first rasterization image that correspond to a fiducial, e.g., (1, 1), (2, 2), (3, 3), and (4, 4). Similarly, the server 106 can identify locations of four pixel values in the second rasterization image that correspond to a fiducial, e.g., (5, 5), (6, 6), (7, 7) to (8, 8). The server 106 can compare the two sets of pixel locations and determine that each of the pixel values differs by an amount of four in each of the X, Y directions, e.g., (1, 1) to (5, 5), (2, 2) to (6, 6), (3, 3) to (7, 7), and (4, 4) to (8, 8). In this case, the server 106 may determine that the camera has changed positions.

In some examples, the server 106 can determine that one fiducial has been identified in a first rasterization image of Feb. 1, 2021 and two fiducials have been identified in a second rasterization image of Feb. 2, 2021. For example, the server 106 can identify locations of three pixel values in the first rasterization image that correspond to a fiducial, e.g., (1, 1), (2, 2), and (3, 3). Similarly, the server 106 can identify locations of three pixel values in the second rasterization image that correspond to a fiducial, e.g., (2, 2), (3, 3), and (4, 4), and identify location of three pixel values in the second rasterization image that correspond to another fiducial, e.g., (10, 10), (11, 11), and (12, 12).

The server 106 can compare the two rasterization images and determine that the first rasterization includes one fiducial and the second rasterization includes two fiducials. This can indicate that the camera has drifted because fiducials represent invariant objects, or objects that do not move between subsequent images, and if the server 106 determines subsequent rasterization images illustrate a different number of fiducials, then the camera has drifted between the Feb. 1, 2021 to Feb. 2, 2021 timeframe. Generally, if the server 106 determines a different number of fiducials between a number of contiguous rasterization images, then the server 106 can determine that the camera has drifted.

In some implementations, the server 106 can detect a new fiducial when an object has been installed in a field of view of the camera. In some cases, new objects may be installed in the field of view of the camera that do not change locations, but the server 106 may identify imagery that do not show the new objects and subsequently show the new objects. Based on the above description, the server 106 may identify this difference as a drift of camera. However, this may not be the case. For example, a new installed object can include a new lane line drawn on the roadway, a new stop sign installed, a new man-made hill, or any other type of object.

To counter this example, the server 106 can analyze a large number of rasterization images over a large period of time to determine that the newly installed object, which was not previously identified from prior rasterization images, is now identified in subsequent rasterization images. More specifically, the server 106 can analyze a large number of rasterization images to indicate that the camera has not drifted because other fiducials surrounding the newly identified fiducial, e.g., newly installed object, have not changed their location. In this example, the server 106 can determine that the newly installed object is a new fiducial and the camera has not adjusted its pose or position. The server 106 can average the fiducials and their locations over a large number of rasterization images to ensure that should new objects be permanently installed in an environment of the field of view of the camera, the server 106 can avoid misidentifying a new fiducial as an indication that the camera has drifted from one position to another position.

In some implementations, the server 106 can compare the difference between fiducial locations in subsequent rasterization images to a threshold value. The server 106 can label the difference between fiducial locations as a potential pose change. The threshold value can be a value set by a designer of systems 100 and 101 or a value that is iteratively learned over time. The threshold value can be based on the focal length and camera resolution of the camera lens. If the focal length is a larger number, then the threshold value can be higher because cameras are likely to exhibit jitter or movement at high focal lengths. Alternatively, if the focal length is a lower number, then the threshold value can be lower because the server can more accurately detect camera movement at lower focal lengths.

Specifically, the server 106 can compare the fiducial coordinates between subsequent rasterization images to determine whether a camera has changed its position. For example, the server 106 can measure the Euclidean distance between two or more fiducial coordinates of subsequent rasterization images. The Euclidean distance can be a measure of a distance in degrees, meters, inches, centimeters, or another unit of measurement, to name a few examples. As such, the server 106 can determine a magnitude amount by which a camera has changed its position.

In some implementations, the server 106 can determine a direction in which the camera has changed its position. Specifically, the server 106 can determine the direction the camera has changed its position by analyzing how the fiducials have changed location across different rasterization images. For example, if a specific fiducial has moved to the right by a particular distance in each subsequent rasterization image, then the server 106 can determine that the camera has changed its position by moving to the left. In another example, if a specific fiducial has moved to the left by a particular distance in each subsequent rasterization image, then the server 106 can determine that the camera has changed its position by moving to the right. Other examples are also possible.

In response to determining the magnitude of the camera's position change and the direction of the camera's position change, the server 106 can represent the camera's position change as a vector. As will be further described below, the server 106 can use the vector representation of the camera's movement to help with adjusting the camera's position.

The server 106 can then compare the magnitude of distance between two or more fiducial coordinates, e.g., potential position change, to a threshold value. A designer or systems 100 and 101 can set the threshold value or the threshold value can be learned through an optimized algorithm implemented by server 106. For example, the threshold value can be 5 degrees or 5 inches, to name a few examples.

During stage (J), if the server 106 determines that the potential pose change is greater than or equal to the threshold value, then the server 106 can recalibrate. Specifically, the server 106 can determine that recalibration is necessary in response to determining the position change amount is greater than or equal to a threshold value. Recalibration can include, for example, sending an operator to physically adjust the pose of the camera to a target pose and sending an instruction to the camera to move in a direction and by an amount that is similar in magnitude and opposite in direction to the vector's representation of the camera's movement, to name a few examples.

During stage (K), if the server 106 determines that the potential pose change is less than the threshold value, then the server 106 can perform an image stabilization. Specifically, the server 106 can determine to perform image stabilization because the magnitude of the vector change is sufficiently small to recalibrate the camera in software rather than based on a physical adjustment. Image stabilization refers to the process by which a camera's focal characteristics are adjusted in software. For example, the server 106 can adjust the camera's pan, tilt, and/or angular rotation to reduce a level of blur or distortion in the camera's video feed or to address the camera's field of view to a desired field of view. Additionally, by performing image stabilization, the server 106 precludes the use having to send a physical operator to adjust the camera in response to detecting a pose change. In some implementations, the server 106 can transform the images produced by the camera before performing image stabilization. Transforming the images can include, for example, transposing the images to different view, e.g., vertical, horizontal, rotated by a specified amount, or some other form of transformation. In response to performing the transforming, the server can perform the image stabilization.

Figure 2A:
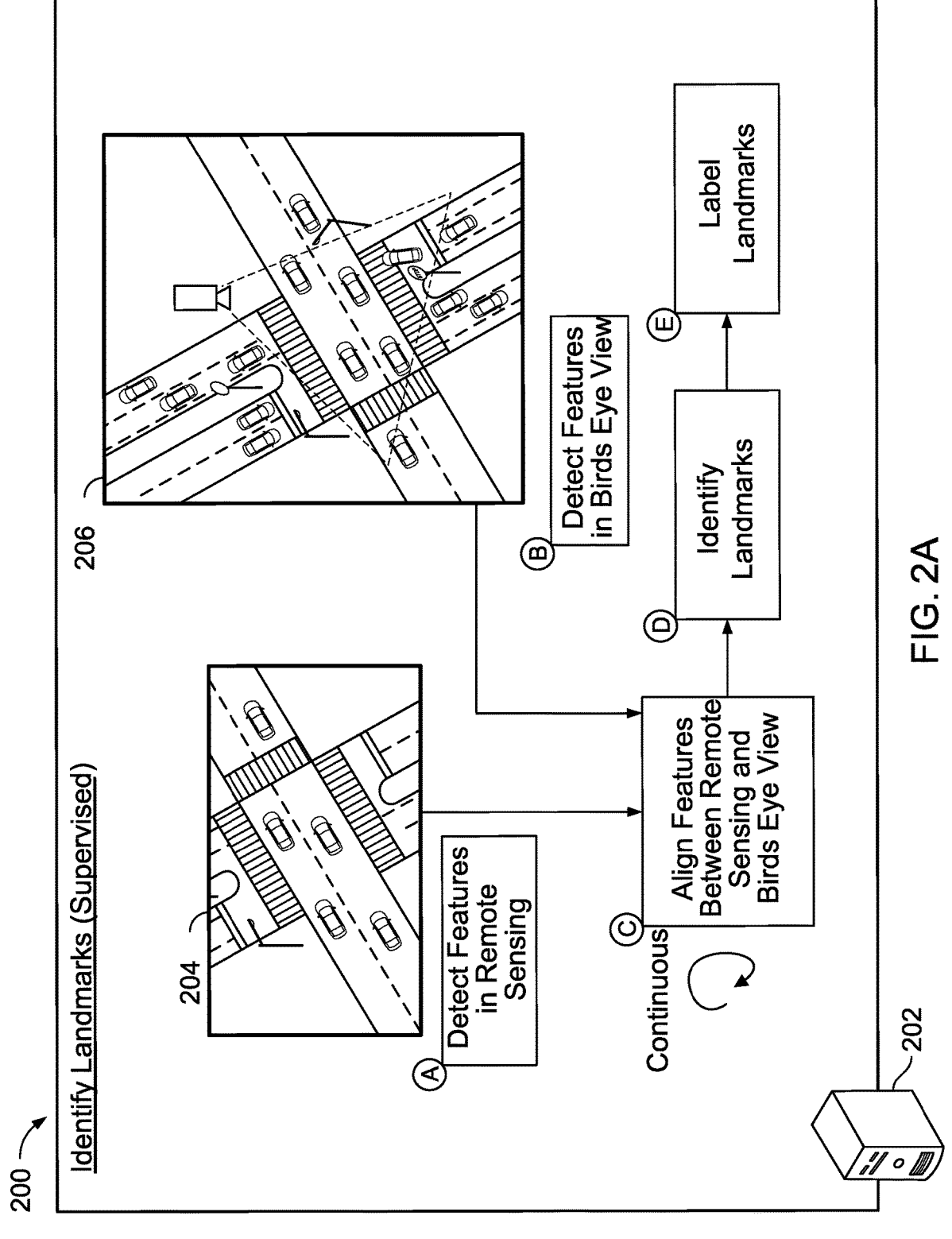
FIGS. 2A-2D are block diagrams that illustrate example systems for estimating camera pose changes using unsupervised and supervised identification methods.

FIG. 2A is a block diagram that illustrates an example system 200 for estimating camera pose changes using unsupervised and supervised identification methods. The system 200 illustrates the process performed by the server 202 for identifying landmarks using the supervised method. The server 202 is similar to server 106 from FIGS. 1A and 1B. Moreover, the process represented in system 200 is similar to processes performed with respect to stages (B) and (C) of FIG. 1B. FIG. 2A illustrates various operations in stages (A) to (E), which can be performed in the sequence indicated, in another sequence, with more stages, or with fewer stages.

During stage (A), the server 202 can perform an initial georeference calibration of camera 103 by analyzing a remote sensing image 204 and a bird's eye view image 206. For example, the server 106 can perform the initial georeference calibration of camera 103 to identify one or more geographic locations in the bird's eye view image 206. The server 106 can attempt to align features of the remote sensing image 204 and the bird's eye view image 206 to indicate the one or more geographic locations in the bird's eye view image 206. First, the server 202 can detect one or more features in the remote sensing image 204.

The one or more features can include stationary objects identified in the remote sensing image 204, non-stationary objects identified in the remote sensing image 204, an orientation of the remote sensing image 204, a reflectance and a luminance of the remote sensing image 204, and other characteristics. The server 202 can use the features detected in the remote sensing image 204 to match to features in the bird's eye view image 206. In some cases, the server 202 can identify pixel colors in the remote sensing image 204 that can be used to aid in projecting matching features from the bird's eye view image 206.

During stage (B), the server 202 can detect one or more features in the bird's eye view image 206. These features can include similar features to those identified in stage (A). Ideally, the bird's eye view image 206 illustrates a similar environment as the remote sensing image 204, making identifying similar features between the two images more likely.

During stage (C), the server 202 can align the features detected from the bird's eye view image 206 and the remote sensing image 204. For example, the server 106 can project the data of the bird's eye view image 206 onto the data of the remote sensing image 204. In this manner, the server 202 can perform an optimization mapping between the sets of data that seeks to identify commonalities between the images and seeks to match the data based on the commonalities. The server 106 can realign the two images to attempt match data from both images and attempt to identify pixels that match between the two image sets.

In response to identifying similar data, e.g., pixels or luminance values, between the two images, the server 202 can label the bird's eye view image 206 with locational information. The locational information can include latitude and longitudinal information for each pixel and/or luminance data in the bird's eye view image 206.

During stage (D), the server 202 can identify landmarks in the now georeferenced bird's eye view image 206 using the supervised method. Specifically, the server 202 can utilize one or more algorithms to detect one or more fiducials or landmarks in the georeferenced image 206. A fiducial can be, for example, a geographic landmark or a man-made object that remains stationary for a long period of time.

During stage (E), the server 202 can label the identified landmarks. The identified landmarks can be labeled with (i) the pixel coordinates of the identified landmark in the image, (ii) the georeferenced coordinates of the identified landmark, and (iii) an indication that the landmark is a fiducial. For example, the server 202 can identify the pixel coordinates of a lane line to be (0.3211, 0.2442) and can then translate the pixel coordinates to the georeferenced coordinates (33.515736, −112.161087) in a particular georeferenced image.

Figure 2B:
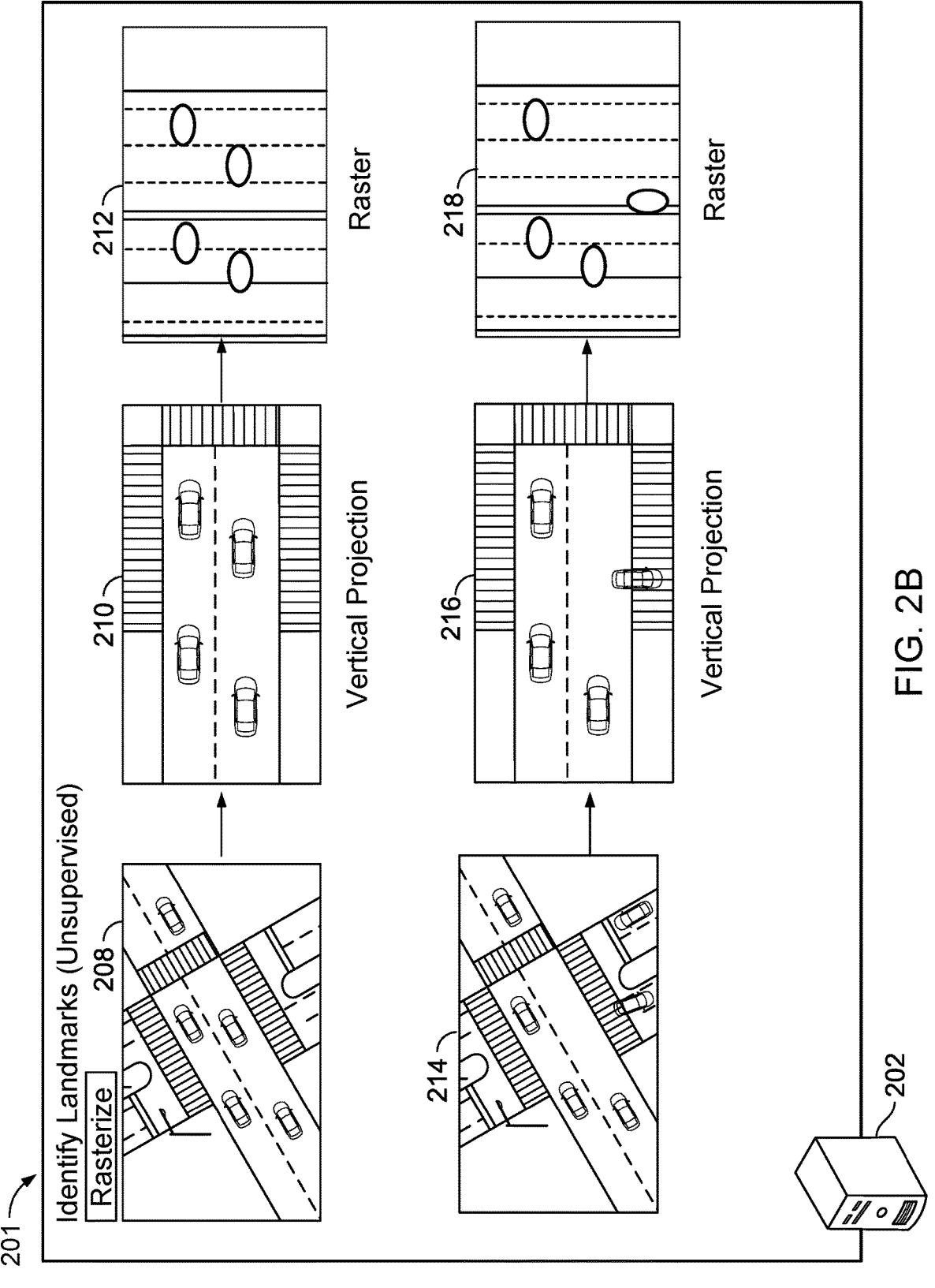

FIG. 2B is another block diagram that illustrates an example system 201 for estimating camera pose changes using unsupervised and supervised identification methods. The system 201 illustrates a process performed by the server 202 for identifying landmarks using an unsupervised method. The server 202 is similar to server 106 from FIGS. 1A and 1B. Moreover, the process presented in system 201 is similar to processes performed with respect to stages (D) through (F) of FIG. 1B.

In some implementations, the server 202 can identify landmarks in various georeferenced images using the unsupervised method. Specifically, the server 202 can analyze the georeferenced images 208 and 214 and identify various features that correspond to invariant objects. In response, the server 202 can label these features as invariant objects.

As illustrated in system 201, the server 202 can transpose each of the georeferenced images 208 and 214 to their respective vertical projections. The vertical projection of image 208 is illustrated as image 210. Similarly, the vertical projection of image 214 is illustrated as image 216. Specifically, the server 202 can rotate the geographic image by a particular degree amount so that a viewpoint of the image changes to a vertical view. Moreover, the vertical projection may preserve the content of the georeferenced image.

In response to transposing each of the georeferenced images 208 and 214, the server 202 can perform a rasterization on each of the transposed images. The server 202 can perform a rasterization on the image 210 and the image 216 by transforming their respective reflectance and luminosity into pixel values. For example, the reflectance and luminosity of objects within the transposed images 210 and 216 can be converted to rasterized images 212 and 218, respectively. The rasterized images 212 and 218 can include RGB values of the transposed images 210 and 216. In some examples, the rasterized images 212 and 218 can illustrate a gray scale or another color scale of the transposed images 210 and 216. For example, the rasterized images 210 and 216 can include optical or photonic content, such as discontinuities, contours, edges, colors, color changes, textures, gradients, convolutions, color stability, and other content, that represent elements in the real world. For example, the rasterized images 212 and 218 can include contours of the moving vehicles and edges of the lane lines.

Figure 2C:
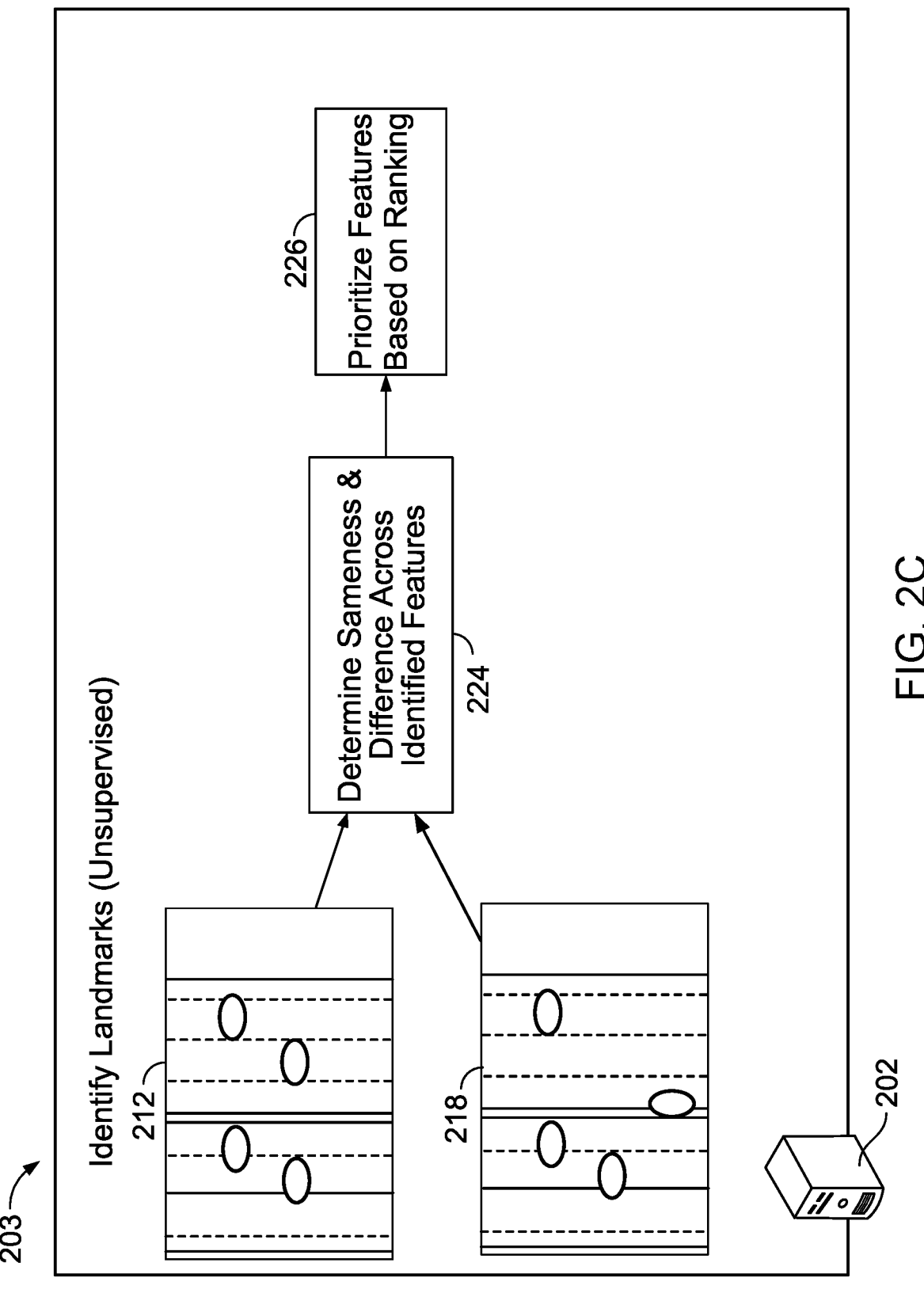

FIG. 2C is another block diagram that illustrates an example system 203 for estimating camera pose changes using unsupervised and supervised identification method. The system 203 illustrates the processes performed by the server 202 for identifying landmarks using the unsupervised method. The system 203 is a continuation of the processes performed with respect to system 201. Moreover, the processes performed in system 203 are similar to the processes performed with respect to stage (H) of FIG. 1B.

For example, the server 202 can determine the sameness and difference across identified features of each of the rasterized images 212 and 218 in 224. Specifically, the server 202 can detect fiducials or landmarks in each of the rasterized images 212 and 218 by comparing features similar to and different from one another. The server 202 can identify optical content in the rasterized image 212, identify optical content in the rasterized image 224, and determine whether the optical content between the first rasterized image 212 and the second rasterized image 224 correspond to fiducials. The server 202 can rely on properties of isomorphism and homomorphism to detect fiducials between the rasterized images. In response to properly identifying fiducials in the rasterized images 212 and 218, the server 202 can label the fiducials at their designated pixel coordinates in the respective images.

In some implementations, the server 202 can prioritize identified features in the rasterized images in 226. These features or fiducials can be prioritized based on a likelihood of them changing location over time. For example, the server 202 can prioritize geographic features over man-made features because of the possibility of the man-made features being removed at a later point in time. In this example, the server 202 may prioritize a fiducial of a hill over a fiducial over a light pole. In some examples, the server 202 may prioritize a fiducial of a grass area over a fiducial of a stop sign. Thus, when using the location of fiducials to estimate pose change in images, the higher prioritized fiducials may be weighted more heavily than the lower prioritized fiducials.

Figure 2D:
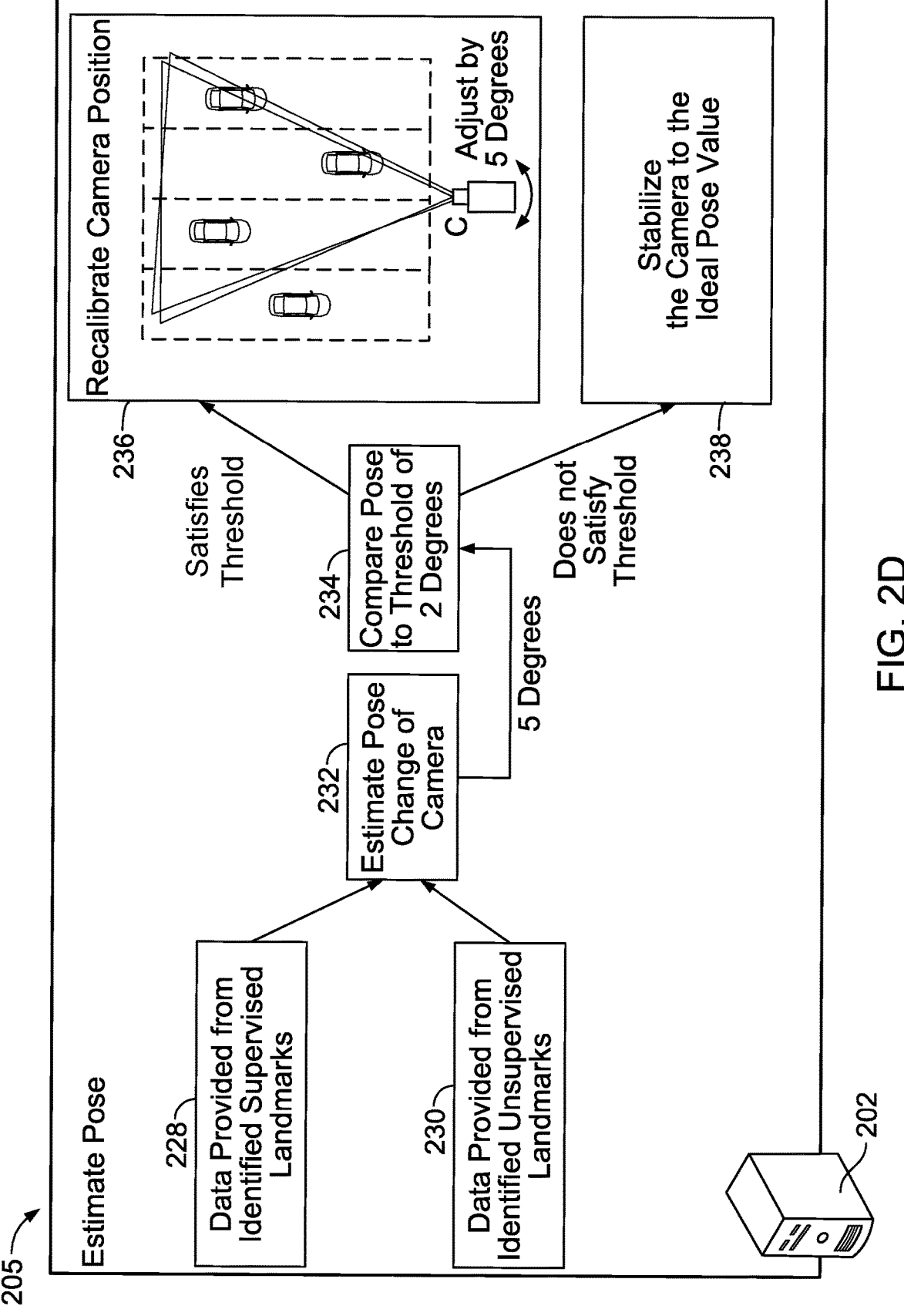

FIG. 2D is another block diagram that illustrates an example system 205 for estimating camera pose changes using unsupervised and supervised identification method.

The system 205 illustrates the processes performed by the server 202 for estimating a pose or position change of a camera. The system 205 is a continuation of the processes performed with respect to system 203. Moreover, the processes performed in system 205 are similar to the processes performed with respect to stages (I) through (K) of FIG. 1B.

For example, the server 202 can estimate a pose change of the camera in 232. The server 202 can utilize the data provided from the identified supervised landmarks in 228 and the data provided from the identified unsupervised landmarks in 230 to make such a determination. Specifically, the server 202 can utilize the locations of the fiducials in each of the rasterization images, e.g., 230, and the locations of fiducials identified from the georeferenced images, e.g., 228, to estimate a pose or position change of the camera. The server 202 can determine whether a pose change of the camera has occurred by analyzing a difference in location of one or more fiducials in a first rasterization image and the location of one or more similar fiducials in a second rasterization image. In some cases, the camera captured the first rasterization image preceding capturing the second rasterization image.

As illustrated in example system 205, the server 202 can determine a pose change of a camera to be 5 degrees from a desired pose or position. Similarly, the server 202 can determine a direction of the pose change of the camera, e.g., an angle from the desired position of the camera. In response to determining the pose change of the camera, the server 202 can compare the pose amount to a threshold value in 234. In this example, the threshold value is set to 2 degrees, but other threshold values are possible.

In response to determining the camera's pose change amount is greater than or equal to the threshold value, the server 202 can perform a recalibration of the camera in 236. A recalibration for the camera can include the server 202 transmitting a notification to an operator to physically adjust the pose of the camera to a target pose, e.g., adjusting the camera by 5 degrees, or physically adjust the pose of the camera by a set amount and in a particular direction, for example. However, if the server 202 determines that the camera's pose change amount is less than the threshold value, the server 202 can perform a recalibration of the camera in software, e.g., an image stabilization technique on the camera. Specifically, the image stabilization can adjust the camera's field of view in software to reduce a level of blur or distortion in the camera's video feed or to adjust the camera's field of view to a desired field of view.

FIG. 3 is a flow diagram that illustrates an example process 300 for estimating a pose change of a camera that is used for roadway surveillance. The server 106 and server 202 may perform the process 300.

In the process 300, the server can obtain a plurality of first image frames from a camera monitoring a specific geographical area (302). Specifically, the server can obtain one or more bird's eye view images from a camera monitoring a specific geographic area. For example, a camera can capture bird's eye view images from a location adjacent to a roadway, other cameras spaced a predetermined distance apart from the camera, and one or more cameras positioned on the roadway itself. The bird's eye view images can be captured at various points in time. For example, a camera can capture a bird's eye view image of the specific geographical area on a particular day, and the camera can capture multiple bird's eye view images on each day, e.g., 100 pictures on one day, 200 pictures on day two, and so on.

In response to obtaining the bird's eye view images, the server can determine one or more characteristics of the camera based on content in the bird's eye view images and the camera itself. Specifically, the server can perform an initial calibration on the camera. The initial calibration can include analyzing the current optical characteristics of the camera to determine its state and to determine whether the optical characteristics need to be changed to new values based on the environment being examined. For example, the optical characteristics can include the camera's focal length, skew coefficients, camera resolution, responsiveness in image capture, and a number of defined pixels identified from the bird's eye view images, to name a few examples.

In some implementations, the server can transmit a status request to the camera and receive the current optical characteristics from the camera over the network. Then, the optical characteristics can be analyzed to determine whether they meet the desired characteristics for monitoring the particular roadway. The server can also analyze the bird's eye view images to determine whether the camera's optical characteristics need to be adjusted.

In some implementations, the server can adjust the camera's optical characteristics to ensure the objects in the camera's field of view are observable with focus and clarity. For example, the server can determine that the focal length of the camera needs to change. In some examples, the server may determine that the camera's resolution settings are too low or too high, and need to be adjusted for performing road surveillance. The server can also adjust other parameters of the camera.

In some implementations, the server can perform an initial georeference calibration of the camera that captures the bird's eye view images. Specifically, the server can capture remote sensing images that were captured from a different camera showing the same geographic region as shown the bird's eye view images. In some cases, the remote sensing images can include a wider geographic region than the geographic region illustrated in the bird's eye view images. For example, aerial devices, such as a plane, UAV, a drone, a helicopter, or another device that looks vertically down upon an area or object can capture the remote sensing data images. One or more satellites orbiting the Earth can also capture the remote sensing images. In some implementations, the remote sensing images can be images that the server transposed from various two-dimensional images. The two-dimensional images can be images captured by other cameras that are proximate to a roadway. Additionally, the remote sensing images can additionally include geographic locations that define the locations shown in the image. For example, each remote sensing image can include a latitude and longitude for each pixel to define the geographic location shown in the image.

The server can perform the initial georeference by identifying one or more geographical components in each of the bird's eye view images using the geographical content from the remote sensing images. In particular, the server can rely on the camera's current optical characteristics when it captured the bird's eye view image. Then, the server can analyze the camera's position, orientation, field of view, and other optical characteristics to project the bird's eye view images to data illustrated in the remote sensing images.

In some implementations, the server can perform the initial georeferencing calibration of camera by projecting the data of the bird's eye view images. For example, the server can project the pixels of a bird's eye view image onto the pixels of each of the remote sensing images. In this manner, the server can perform an optimization mapping between the sets of data in a manner that observes commonalities between the images and seeks to match the data based on commonalities. The match or mapping can be identified based on a comparison of RGB values between pixels and threshold values. In some implementations, the server can perform other methods for georeferencing the bird's eye view image.

For each first image frame of the plurality of first image frames: the server can generate a second image frame from the first image frame by adjusting a viewpoint of the first image frame (304). Moreover, the server performs in an iterative loop stages (304), (306), and (308) as further described below. In some implementations, the server can analyze multiple aggregated bird's eye view images. Each of these bird's eye view images can include geographic locational data when processed against remote sensing data. Then, the server can transpose each of the bird's eye view images with geographic locational data to a vertical projection, as will be further described below.

In some implementations, the server can identify landmarks in each of the bird's eye view images. The server can identify landmarks utilizing a supervised method and an unsupervised method. Specifically, in the supervised method, the server can identify one or more fiducials, which will aid in estimating a position change of the camera. A fiducial can be, for example, an object, element, or component that is used as a reference point in the image. For example, a fiducial can include a geographic landmark, e.g., a mountain, a hill, a rock, an ocean, or another geographic landmark. Similarly, a fiducial can include a man-made object that remains stationary between subsequent bird's eye view images. For example, a man-made fiducial can include lane lines on a road, a light fixture, pole, a stop sign, sidewalks, curbs, grass medians between lanes, and other man-made object that are stationary. The server can utilize various algorithms to detect one or more fiducials in the bird's eye view image. In response to detecting the fiducials, the server can label the fiducials with (i) pixel coordinates, (ii) georeferenced coordinates, and (iii) a fiducial indication.

In some implementations, the server can identify landmarks in each of the bird's eye view images using the unsupervised method. Specifically, in the unsupervised method, the server can analyze the bird's eye view images and identify various features that represent variant and invariant objects. The server can utilize the invariant features that are likely to represent objects that appear to be stationary. The variant features can represent objects that move or are not stationary. For example, the invariant features can include lane lines, stoplights, poles, sidewalks, curbs, mountains, hills, and other objects. The variant features can include, for example, people, vehicles, pets, trees with falling leaves, and other objects that can move over a period of time. In response to identifying the invariant features, the server can estimate a pose or position change of the camera over a period of time.

In order to identify the invariant features of the bird's eye view image, the server can transform each of the bird's eye view images that includes geographic information. Specifically, the server can transpose each bird's eye view image to a vertical projection. The vertical projection rotates the geographic image by a particular degree amount, e.g., 10, 50, or 90 degrees, so that a viewpoint of the image changes to a vertical view. Moreover, the vertical projection can preserve the content of the geographic image. For example, the content of the geographic image can include the data from the captured image and the locational information for each component of the image. However, in some cases, the vertical projection may reduce a size of the geographic image. In some cases, the vertical projection may not reduce a size of the geographic image.

In some implementations, the server can assign cardinality directions to the transposed images. For example, the server can assign North, South, East, and West directions on each of the transposed images. The server assigns cardinality to aid with identifying fiducials and other invariant objects in the images. Moreover, the cardinality aids the server in filtering out objects that may be in the same location across multiple images but adjusts its orientation. The server can identify its orientation and any adjustments in orientation by analyzing whether an object has changed its orientation from North to South, East to West, West to East, Northwest to Northeast, or others, to name a few examples.

The server can generate a third image frame from the second image frame by rasterizing the second image frame (306). In some implementations, the server can perform a rasterization on the transposed images. The server performs the rasterization on the transposed images by transforming a reflectance and luminosity of objects within the transposed image to pixel values. The rasterization frame can include the converted pixel values. For example, the reflectance and luminosity of objects within a particular image, e.g., the geographic image, can be converted to Red-Green-Blue (RGB) values. These RGB values or pixel values of the rasterized image can be displayed on computer screens, client devices, displays, and other devices. The rasterized form of the geographic image can also include the locational information generated above.

The server can identify photonic content in the third image frame (308). In response to performing the rasterization, the server can identify photonic content in each rasterized frame. Specifically, the server can analyze and identify a rasterized frame to identify its optical or photonic content, such as discontinuities, contours, edges, colors, and color changes, to name a few examples. Moreover, the server can identify textures, gradients, and other content found in the rasterized image. Generally, the optical or photonic content can represent physical elements present in the real world illustrated by the bird's eye view image. For example, the server may identify contours, edges, textures, and other characteristics of the rasterized image that represent lane lines, stoplights, poles, curbs, sidewalks, and other invariant objects, to name a few examples. The server can generate data that identifies the optical content for rasterized image and can compare subsequent rasterized images to one another.

The server can determine one or more invariant components in a plurality of third image frames based on the photonic content identified in subsequent third image frames (310). Specifically, the server can determine the one or more invariant components in the rasterized image frames by comparing features between subsequent rasterized images, identifying static features between subsequent images that do not change location, and identifying one or more non-static features that do change location.

For example, the server can compare the identified optical content between one or more subsequent rasterized images by aligning the rasterized images to see if the optical content similarly compares. In another example, the server can compare optical content information between subsequent rasterized images to one another based on isomorphism and homomorphism. Isomorphism can represent characteristics between two independent images that have a similar number of characteristics, e.g., a number of nodes, a number of edges, a number of connections between nodes and edges, and a number of content, to name a few examples. Homomorphism includes homologous features that can represent a mathematical mapping between two structures, and in this case, the two structures can be a first rasterization image and a second rasterization image. The server can create a mathematical model that represents a mapping between features represented by the first rasterization image and a second rasterization image. The server can determine an isomorphism of the mathematical model that indicates how similar the features are to one another. For example, a high isomorphic score can indicate similar optical content and similar locations of the optical content between the two images. A low isomorphic score can represent dissimilar optical content and/or dissimilar locations of the optical content.

The server can seek to align one or more rasterized images based on their similar optical content. For example, a first rasterized image captured on Dec. 1, 2020 may include an edge that represents a curb and a contour that represents an outer perimeter of a bicycle. The server can identify the edge and the contour in the first rasterized image and indicate that these appear to be likely fiducials. Then, the server an obtain a second rasterized image captured on Dec. 2, 2021, and identify from the second rasterized image another edge that represents a curb and another contour that represents an outer perimeter of a bicycle.

The server can compare the optical content, e.g., edges and contours, between the two rasterized images to determine if their respective optical content can represent a fiducial. The server can determine that the content of the edge and the pixel location of the edge in the first rasterized image match to the content of the edge and the pixel location of the edge in the second rasterized image. In response, the server can identify the detected edge between the two rasterized images as a likely invariant feature.

Additionally, the server can determine that the content of the contour in the first rasterization image matches to the content of the contour in the second rasterization image. However, the server can determine that the location of the contour in the first rasterization image is different from the location of the contour in the second rasterization image. This may be, for example, a user picked up the bicycle and started riding the bicycle to another different location. In response to determining that the contour has changed locations between subsequent rasterization images, the server can determine that edge represents an invariant component and the contour represents a variant component. Other examples to identify invariant and variant components are also possible.

The server can determine one or more position changes of the camera by identifying one or more position changes of the one or more invariant components in the subsequent third image frames (312). In response to identifying the invariant components in the rasterized images, the server can seek to estimate a pose change of the camera. Specifically, the server can utilize the locations of the identified fiducials in each of the rasterization images to estimate a pose change of the camera. The server can estimate the pose change, and monitor the pose change over time, by monitoring the locations of identified fiducials across two, three, four, ten, and up to N number of rasterization images, for example.

The server can compare the difference between fiducial locations in subsequent rasterization images to a threshold value. Specifically, the server can compare fiducial locations represented by fiducial coordinates between subsequent rasterization images to determine whether a camera has changed its position across the images. For example, the server can measure the Euclidean distance between two or more fiducial coordinates of subsequent rasterization images. The Euclidean distance can be a measure of a distance in degrees, meters, inches, centimeters, or another unit of measurement, to name a few examples. In some examples, the server can measure the Euclidean distance between fiducial locations across two or more images and can continue measuring the Euclidean distance across multiple images on a continuing basis. As such, the server can determine a magnitude amount by which a camera has changed its position or not changed position. The server can compare the magnitude of distance of the camera's position change to a threshold value. The threshold value can be 2 degrees, 2 inches, or some other value set by a designer or learned iteratively, to name a few examples.

In some implementations, the server can compare fiducial locations between an initial rasterization image and any subsequent rasterization image. For example, the server can compare fiducial locations of a rasterization image captured on Jan. 1, 2021 to fiducial location to a rasterization image captured on Jul. 1, 2021, Dec. 1, 2021, or Dec. 3, 2021, to name some examples. The server can perform this comparison process against an initial position of the camera because the initial position of the camera may be initially calibrated to a desired position. If the camera moves in a direction and magnitude away from the initial position, and that movement is greater than a threshold value, then server can determine the camera has indeed changed positions.

In response to determining the one or more position changes of the camera, the server can adjust a position of the camera (314). In some implementations, the server can determine to recalibrate the camera if the position change is greater than or equal to the threshold value. For example, the server determines that an estimated pose change of 5 degrees, when compared to the threshold value of 2 degrees, then the server can deem the camera has changed positions. Recalibration can include, for example, sending an operator to physically adjust the pose of the camera to a target pose and sending an instruction to the camera to move in a direction and by an amount that is similar in magnitude and opposite in direction to the vector's representation of the camera's movement, to name a few examples. Recalibration can be necessary to ensure the camera is performing road surveillance in a desired manner.

In some implementations, the server can determine to transform and stabilize the camera if the position change is less than the threshold value. Specifically, the server can determine that image stabilization is to be performed because the magnitude of the camera's position change is small enough that adjusting the camera's stabilization in software is sufficient. Image stabilization refers to the process by which a camera's focal characteristics are adjusted in software. For example, the server can adjust the camera's pan, tilt, and/or angular rotation to reduce a level of blur or distortion in the camera's video feed or to address the camera's field of view to a desired field of view. Additionally, by performing image stabilization, the server precludes the use having to send a physical operator to adjust the camera in response to detecting a pose change.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
obtaining, by one or more processors, a plurality of first image frames from a camera that is monitoring a specific geographical area from an elevated viewpoint;
for each first image frame of the plurality of first image frames from the camera that is monitoring the specific geographical area from the elevated viewpoint:
generating, by the one or more processors, a second image frame from the first image frame from the camera that is monitoring the specific geographical area from the elevated viewpoint by generating vertical projection of the first image frame to a birds-eye view;
generating, by the one or more processors, a third image frame from the second image frame that is a vertical projection of the first image frame by converting pixel values of the second image frame to produce rasterized pixel data in the third image frame; and
identifying, by the one or more processors, photonic content from the rasterized pixel data in the third image frame;
determining, by the one or more processors, one or more invariant components classified as stationary in a plurality of third image frames based on the photonic content identified in subsequent third image frames;
determining, by the one or more processors, one or more position changes of the camera by measuring differences between locations indicated by the rasterized pixel data corresponding to the one or more invariant components between successive third image frames in the plurality of third image frames;
comparing, by the one or more processors, the one or more position changes of the camera to a threshold value; and
in response to determining the one or more position changes of the camera satisfies the threshold value, adjusting, by the one or more processors, a position of the camera.

2. The computer-implemented method of claim 1, wherein obtaining the plurality of first image frames from the camera monitoring the specific geographic area comprises:
determining, by the one or more processors, one or more characteristics of the camera based on content of the plurality of first image frames; and

33

34 adjusting, by the one or more processors, the one or more characteristics of the camera for monitoring the specific geographical area.

3. The computer-implemented method of claim 1, wherein obtaining, by the one or more processors, a plurality of fourth image frames of the specific geographic area, wherein each fourth image frame of the plurality of fourth image frames include content of the specific geographical area and imagery of the camera;

identifying, by the one or more processors, one or more geographical components in each first image frame of the plurality of first image frames using geographical content from the plurality of fourth image frames; and determining, by the one or more processors, a geographical field of view of the camera based on the one or more geographical components in each first image frame of the plurality of first image frames.

4. The computer-implemented method of claim 3, wherein the plurality of fourth image frames are obtained from at least one of a satellite, an unmanned aerial vehicle, and an airplane.

5. The computer-implemented method of claim 1, wherein generating the second image frame from the first image frame by adjusting the elevated viewpoint of the first image frame comprises:

transposing, by the one or more processors, the first image frame by an orthogonal projection to the second image frame, wherein the second image frame is a 90 degree rotated viewpoint of the first image frame; and assigning, by the one or more processors, data indicative of cardinality to the second image frame.

6. The computer-implemented method of claim 5, wherein identifying the photonic content from the rasterized pixel data in the third image frame comprises:

identifying, by the one or more processors, one or more edges in the third image frame;

identifying, by the one or more processors, one or more contours in the third image frame; and identifying, by the one or more processors, a specific color in the third image frame.

7. The computer-implemented method of claim 1, wherein determining the one or more invariant components classified as stationary in the plurality of third image frames based on the photonic content identified in subsequent third image frames comprises:

obtaining, by the one or more processors, the plurality of third image frames by aggregating each subsequent third image frame; and detecting, by the one or more processors, one or more static features in each of the plurality of third image frames by (i) comparing features between subsequent third image frames, (ii) identifying the one or more static features between the subsequent third image frames of the features that do not change location, and (iii) identifying one or more non static features between the subsequent third image frames of the features that do change location.

8. The computer-implemented method of claim 7, wherein determining the one or more position changes of the camera by measuring differences between locations indicated by the rasterized pixel data corresponding to the one or more invariant components between successive third image frames in the plurality of third image frames further comprises:

determining, by the one or more processors, a location for each of the one or more static features in the plurality of third image frames;

for each third image frame of the plurality of third image frames:

determining, by the one or more processors, a difference amount between the location of each of the one or more static features in between an initial third image frame and a subsequent third image frame;

comparing, by the one or more processors, the difference amount to a second threshold value; and in response to determining the difference amount satisfies the second threshold value, identifying, by the one or more processors, a position change of the camera.

9. The computer-implemented method of claim 7, wherein determining the one or more position changes of the camera by measuring differences between locations indicated by the rasterized pixel data corresponding to the one or more invariant components between successive third image frames in the plurality of third image frames further comprises:

determining, by the one or more processors, a location for each of the one or more static features in the plurality of third image frames;

for each third image frame of the plurality of third image frames:

determining, by the one or more processors, a difference amount between the location of each of the one or more static features in between the third image frame and an initial raster frame;

comparing, by the one or more processors, the difference amount to a threshold value; and in response to determining the difference amount satisfies the threshold value, identifying, by the one or more processors, a position change of the camera from an initial calibrated position.

10. The computer-implemented method of claim 1, wherein adjusting the position of the camera further comprises at least one of:

recalibrating, by the one or more processors, optical characteristics of the camera to match to an initial calibrated position of the camera; or adjusting, by the one or more processors, the position of the camera to the initial calibrated position of the camera.

11. The computer-implemented method of claim 1, wherein the one or more invariant components represent geographic components comprising at least one of a pole, a lane marker, a hill, a median, crosswalks, mountain, and a tree.

12. A system comprising:

one or more processors;

one or more computers and one or more storage devices storing instructions that are operable, when executed by the one or more computers, to cause the one or more computers to perform operations comprising:

obtaining, by the one or more processors, a plurality of first image frames from a camera that is monitoring a specific geographical area from an elevated viewpoint;

for each first image frame of the plurality of first image frames from the camera that is monitoring the specific geographical area from the elevated viewpoint:

generating, by the one or more processors, a second image frame from the first image frame from the camera that is monitoring the specific geographical area from the elevated viewpoint by generating vertical projection of the first image frame to a birds-eye view;

generating, by the one or more processors, a third image frame from the second image frame that is a vertical projection of the first image frame by converting pixel values of the second image frame to produce rasterized pixel data in the third image frame; and identifying, by the one or more processors, photonic content from the rasterized pixel data in the third image frame;

determining, by the one or more processors, one or more invariant components classified as stationary in a plurality of third image frames based on the photonic content identified in subsequent third image frames;

determining, by the one or more processors, one or more position changes of the camera by measuring differences between locations indicated by the rasterized pixel data corresponding to the one or more invariant components between successive third image frames in the plurality of third image frames;

comparing, by the one or more processors, the one or more position changes of the camera to a threshold value; and in response to determining the one or more position changes of the camera satisfies the threshold value, adjusting, by the one or more processors, a position of the camera.

13. The system of claim 12, wherein obtaining the plurality of first image frames from the camera monitoring the specific geographic area further comprises:

determining, by the one or more processors, one or more characteristics of the camera based on content of the plurality of first image frames; and adjusting, by the one or more processors, the one or more characteristics of the camera for monitoring the specific geographical area.

14. The system of claim 12, wherein obtaining, by the one or more processors, a plurality of fourth image frames of the specific geographic area, wherein each fourth image frame of the plurality of fourth image frames include content of the specific geographical area and imagery of the camera;

identifying, by the one or more processors, one or more geographical components in each first image frame of the plurality of first image frames using geographical content from the plurality of fourth image frames; and determining, by the one or more processors, a geographical field of view of the camera based on the one or more geographical components in each first image frame of the plurality of first image frames.

15. The system of claim 14, wherein the plurality of fourth image frames are obtained from at least one of a satellite, an unmanned aerial vehicle, and an airplane.

16. The system of claim 12, wherein generating the second image frame from the first image frame by adjusting the elevated viewpoint of the first image frame comprises:

transposing, by the one or more processors, the first image frame by an orthogonal projection to the second image frame, wherein the second image frame is a 90 degree rotated viewpoint of the first image frame; and assigning, by the one or more processors, data indicative of cardinality to the second image frame.

17. The system of claim 16, wherein identifying the photonic content from the rasterized pixel data in the third image frame comprises:

identifying, by the one or more processors, one or more edges in the third image frame;

identifying, by the one or more processors, one or more contours in the third image frame; and identifying, by the one or more processors, a specific color in the third image frame.

18. The system of claim 12, wherein determining the one or more invariant components classified as stationary in the plurality of third image frames based on the photonic content identified in subsequent third image frames further comprises:

obtaining, by the one or more processors, the plurality of third image frames by aggregating each subsequent third image frame; and detecting, by the one or more processors, one or more static features in each of the plurality of third image frames by (i) comparing features between subsequent third image frames, (ii) identifying the one or more static features between the subsequent third image frames of the features that do not change location, and (iii) identifying one or more non static features between the subsequent third image frames of the features that do change location.

19. The system of claim 18, wherein determining the one or more position changes of the camera by measuring differences between locations indicated by the rasterized pixel data corresponding to the one or more invariant components between successive third image frames in the plurality of third image frames comprises:

determining, by the one or more processors, a location for each of the one or more static features in the plurality of third image frames;

for each third image frame of the plurality of third image frames:

determining, by the one or more processors, a difference amount between the location of each of the one or more static features in between an initial third image frame and a subsequent third image frame;

comparing, by the one or more processors, the difference amount to a threshold value; and in response to determining the difference amount satisfies the threshold value, identifying, by the one or more processors, a position change of the camera.

20. A non-transitory computer-readable medium storing software comprising instructions executable by one or more computers which, upon such execution, cause the one or more computers to perform operations comprising:

obtaining, by one or more processors, a plurality of first image frames from a camera that is monitoring a specific geographical area from an elevated viewpoint;

for each first image frame of the plurality of first image frames from the camera that is monitoring the specific geographical area from the elevated viewpoint:

generating, by the one or more processors, a second image frame from the first image frame from the camera that is monitoring the specific geographical area from the elevated viewpoint by generating vertical projection of the first image frame to a birds-eye view;

generating, by the one or more processors, a third image frame from the second image frame that is a vertical projection of the first image frame by converting pixel values of the second image frame to produce rasterized pixel data in the third image frame; and identifying, by the one or more processors, photonic content from the rasterized pixel data in the third image frame;

determining, by the one or more processors, one or more invariant components classified as stationary in a plurality of third image frames based on the photonic content identified in subsequent third image frames;

determining, by the one or more processors, one or more position changes of the camera by measuring differences between locations indicated by the rasterized pixel data corresponding to the one or more invariant components between successive third image frames in the plurality of third image frames;

comparing, by the one or more processors, the one or more position changes of the camera to a threshold value; and in response to determining the one or more position changes of the camera satisfies the threshold value, adjusting, by the one or more processors, a position of the camera.

\* \* \* \* \*